(12) United States Patent
Tsukada et al.

(10) Patent No.: US 8,307,244 B2
(45) Date of Patent: Nov. 6, 2012

(54) STORAGE SYSTEM AND STORAGE CONTROL APPARATUS

(75) Inventors: Kouichi Tsukada, Kawasaki (JP); Akira Sampei, Kawasaki (JP); Fumio Hanzawa, Kawasaki (JP); Hiroaki Sato, Kawasaki (JP); Kazuo Nakashima, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 188 days.

(21) Appl. No.: 12/786,626

(22) Filed: May 25, 2010

(65) Prior Publication Data

US 2010/0306576 A1 Dec. 2, 2010

(30) Foreign Application Priority Data

May 28, 2009 (JP) ................................. 2009-129054

(51) Int. Cl.
*G06F 11/00* (2006.01)
(52) U.S. Cl. ........... 714/23; 714/4.1; 714/4.21; 714/4.3; 714/36; 714/43
(58) Field of Classification Search ................ 714/4.1, 714/4.21, 4.3, 23, 36, 43
See application file for complete search history.

(56) References Cited

U.S. PATENT DOCUMENTS

| 7,137,020 B2 * | 11/2006 | Gilstrap et al. ............... 713/324 |
| 7,251,744 B1 * | 7/2007 | Housty ....................... 714/6.32 |
| 7,467,322 B2 * | 12/2008 | Baba ........................... 714/4.11 |
| 7,523,350 B2 * | 4/2009 | Lintz et al. ................... 714/36 |
| 7,676,693 B2 * | 3/2010 | Otsuka et al. ................. 714/23 |
| 8,074,105 B2 * | 12/2011 | Kalwitz et al. ............... 714/6.22 |
| 2003/0110330 A1 | 6/2003 | Fujie et al. |
| 2005/0278581 A1 | 12/2005 | Jiang et al. |
| 2008/0244098 A1 | 10/2008 | Oikawa et al. |
| 2009/0094620 A1 * | 4/2009 | Kalwitz et al. ............... 719/325 |

FOREIGN PATENT DOCUMENTS

| JP | 61-260342 | 11/1986 |
| JP | 8-305468 | 11/1996 |
| JP | 2003-196036 | 7/2003 |
| JP | 2005-339216 | 12/2005 |
| JP | 2008-242872 | 10/2008 |

OTHER PUBLICATIONS

Japanese Patent Office Action mailed Feb. 1, 2011, for corresponding Japanese Patent Application No. 2009-129054.

* cited by examiner

*Primary Examiner* — Joshua P Lottich
(74) *Attorney, Agent, or Firm* — Staas & Halsey LLP

(57) ABSTRACT

A storage system includes first and second expanders for connecting storage units, each of the first and second expanders being connected cascade each other, a first controller connected one of the first and one of the second expanders and a host, a second controller connected the one of the second expanders, the one of the first expanders and the host, the second controller detecting a failure of at least one of the first controller, the first expanders and the second expanders, the second controller selectively controlling a first boot sequence which boots the first controller after the first expanders have been booted and a second boot sequence which boots the first controller before the first expanders have been booted, determining one of the first boot sequence and the second boot sequence on the basis of a place where a failure has occurred in a recovery process.

7 Claims, 27 Drawing Sheets

STORAGE SYSTEM AND STORAGE CONTROL APPARATUS

CROSS-REFERENCE TO RELATED APPLICATION

This application is based upon and claims the benefit of priority of the prior Japanese Patent Application No. 2009-129054, filed on May 28, 2009 the entire contents of which are incorporated herein by reference.

FIELD

The embodiment discussed herein is related to a storage system including a plurality of storage apparatuses.

BACKGROUND

There are known methods for improving the reliability of a storage controlling system including a plurality of storage apparatuses upon the occurrence of a failure and known methods for preventing a reduction in the performance of such a system. Japanese Laid-open Patent Publication Nos. 2005-339216 and 2008-242872 relates the known methods FIG. 20 is a diagram schematically illustrating the configuration of a related-art storage controlling system.

Referring to FIG. 20, the related-art storage controlling system, indicated at 900, is a Redundant Arrays of Inexpensive Disks (RAID) system including arrays of storage apparatuses, for example. The storage controlling system 900 is connected to a host computer 901, serving as an upper-level apparatus.

The storage controlling system 900 performs processing, for example, reads or writes data from/to a storage apparatus (not illustrated) in accordance with an input or output request (e.g., a read command or a write command) from the host computer 901. In some cases, such an input or output request is also called "I/O command".

Referring to FIG. 20, the storage controlling system 900 includes control modules (hereinafter, "CMs") #00 and #01 and expanded enclosures DE#001 and DE#002. The CMs #00 and #01 are connected to the host computer 901. The CMs #00 and #01 are connected in series to the expanded enclosures DE#001 and DE#002. Specifically, as illustrated in FIG. 20, the CMs #00 and #01 are connected to the expanded enclosure DE#001, and the expanded enclosure DE#001 is connected to the expanded enclosure DE#002. The CMs #00 and #01 are received in an enclosure DE#000.

The CMs #00 and #01 perform various controls in the storage controlling system 900. The CMs #00 and #01 control access to the storage apparatuses included in the expanded enclosures DE#001 and DE#002 in accordance with I/O commands transmitted from the host computer 901.

The CM #00 includes a RAID-On-Chip (RoC) 801a and a back end expander (BE-EXP) 802a. The CM #01 includes a RoC 801b and a BE-EXP 802b.

The RoCs 801a and 801b perform various controls in the CMs #00 and #01, respectively. The RoCs 801a and 801b each include two interfaces DI#00 and DI#01. In the RoC 801a, the interface DI#00 is connected to the BE-EXP 802a via a data path 811a. In addition, the interface DI#01 is connected to the BE-EXP 802b in the CM #01 via a data path 812a.

In the RoC 801b, similarly, the interface DI#00 is connected to the BE-EXP 802b via a data path 811b. In addition, the interface DI#01 is connected to the BE-EXP 802a in the CM #00 via a data path 812b.

In other words, in the related-art storage controlling system 900 in FIG. 20, the RoC 801a in the CM #00 is connected to the BE-EXP 802b in the other CM #01 through the interface DI#01 and the RoC 801b in the other CM #01 is connected to the BE-EXP 802a in the CM #00 through the interface DI#01 (cross connection).

The BE-EXPs 802a and 802b are connected to one or more common storage apparatuses (not illustrated) and control access to the storage apparatuses in accordance with disk access commands transmitted from the RoCs 801a and 801b. Since each of the BE-EXPs 802a and 802b is connected to the one or more storage apparatuses, an access path to each storage apparatus is duplicated.

Each of the expanded enclosures DE#001 and DE#002 includes one or storage apparatuses (not illustrated) and expanders (EXPs) 803a and 803b such that the EXPs 803a and 803b are connected to the one or more storage apparatuses to duplicate an access path to each storage apparatus.

The EXPs 803a and 803b control access to the storage apparatuses in accordance with disk access commands transmitted from the RoCs 801a and 801b.

The EXP 803a in the expanded enclosure DE#001 is connected to the BE-EXP 802a in the enclosure DE#000 via a data path 813a-1. The EXP 803a in the expanded enclosure DE#0002 is connected to the EXP 803a in the expanded enclosure DE#001 via a data path 813a-2.

Similarly, the EXP 803b in the expanded enclosure DE#001 is connected to the BE-EXP 802b in the enclosure DE#000 via a data path 813b-1. The EXP 803b in the expanded enclosure DE#002 is connected to the EXP 803b in the expanded enclosure DE#001 via a data path 813b-2.

In the enclosure DE#000, the RoCs 801a and 801b each have a monitoring function of monitoring whether a system abnormality has occurred in the storage controlling system 900. When detecting the occurrence of the abnormality in any of the EXPs 803a and 803b, the RoC 801a or 801b disconnects the relevant EXP 803a or 803b. For example, if an abnormality is detected in either of the CMs #00 and #01, the other CM disables the CM in which the abnormality has been detected.

FIGS. 21 to 23 are diagrams explaining a process of recovering the disabled CM #00 in the related-art storage controlling system.

For example, if the CM #00 is disabled for any reason, the EXPs 803a in the expanded enclosures DE#001 and DE#002 connected to, or under the interface DI#00 of the CM #00 are also disabled.

The disabled CM #00 or #01 and the EXPs 803 are recovered by a process of incorporating into the storage controlling system.

In the related-art storage controlling system 900, when the CM #00 is recovered from the disabled status, the EXP 803a in the expanded enclosure DE#001 is subjected to the incorporating process (refer to FIG. 22). After the EXP 803a in the expanded enclosure DE#001 is recovered, the incorporating process on the EXP 803a in the expanded enclosure DE#002 is started (refer to FIG. 23). At the completion of the incorporating process on the EXP 803a in the expanded enclosure DE#002, the storage controlling system 900 enters the normal status.

The process of incorporating an EXP into the related-art storage controlling system will now be described with reference to a flowchart (including A10 to A120) illustrated in FIG. 24.

The process of incorporating the EXP 803a is performed by the CM which is not disabled. In the following description, it is assumed that the CM #01 which is not disabled performs the process of incorporating any EXP 803a under the disabled CM #00.

To incorporate the EXP 803a, the CM #01 reboots the EXP 803a to be incorporated (A10). If only the CM is to be incorporated, this EXP 803a is not rebooted.

The CM #01 starts a timer (EXP READY monitoring timer) for monitoring whether an EXP READY notification has been transmitted (A20). The EXP READY notification is information indicating the completion of boot-up of the EXP 803a.

The CM #01 determines whether the EXP READY notification has reached for a predetermined time (A30). If the EXP READY notification has not reached the CM #01 for the predetermined time (NO in A30), the incorporation of the EXP 803a is interrupted (A40). The process is terminated.

If the EXP READY notification has reached the CM #01 for the predetermined time (YES in A30), the CM #01 changes an EXP status indicating the status of the EXP 803a (A50). In addition, the CM #01 cancels the EXP READY monitoring timer (A60).

After that, the CM #01 sets DEID related to the EXP 803a, time-of-day (TOD), and the model type of CM (hereinafter, "CM model type") (A70 to A90). The DEID is information for identifying the expanded enclosure on which the EXP 803a is mounted.

In addition, the CM #01 acquires the World Wide Name (WWN) of the EXP 803a and the version number of firmware ("Firm Version Number") (A100 and A110).

After that, the CM #01 sets the EXP status indicating the status of the EXP 803a to "ONLINE" (A120).

In the storage controlling system in which the RoCs are cross-connected to the BE-EXPs, however, the system cannot be recovered in some cases during, for example, incorporation of the CM #00, as will be described below.

FIG. 25 illustrates a status during recovery of the CM #00 in the related-art storage controlling system 900. In the case illustrated in FIG. 25, the incorporation of the CM #00 is completed but the EXP 803a in the expanded enclosure DE#001 and the subsequent EXP 803a have not yet been recovered. Referring to FIG. 25, the CM #00 has been disconnected and then incorporated while an abnormality occurred in the interface DI#01 (on the INPUT side of the BE-EXP 802b in the CM #01) in the CM #00 is not removed.

In the storage controlling system, when the incorporation of the CM #00 is completed, a disk access from the host computer 901 to a storage apparatus under the CM #00 may occur.

As shown in FIG. 25, however, the expanded enclosures DE#001 and DE#002 are recovered after the completion of the incorporation of the CM #00 in the related-art storage controlling system. Accordingly, even if the incorporation of the CM #00 is completed while the interface DI#01 in the RoC 801a has the abnormality, a disk access from the host computer 901 may occur, regardless of the absence of an access path from the CM #00 to the expanded enclosure DE#002.

Consequently, all of access to the expanded enclosure DE#002 result in errors, finally leading to disk abnormalities. Disadvantageously, the CM #00 cannot be incorporated into the system and the storage controlling system 900 cannot be recovered.

FIG. 26 is a diagram explaining a host I/O command and broadcasts (BCs) in the related-art storage controlling system.

In the storage controlling system 900, after the incorporation of the CM #00 is completed, the BE-EXP 802a and the EXPs 803a under the CM #00 are sequentially incorporated into the system. Each time the component is incorporated, a broadcast is performed in order to acquire information from an interface chip (not illustrated). A broadcast signal is output to a route (data paths 811a, 813a-1, and 813a-2).

Furthermore, after the CM #00 is incorporated into the storage controlling system 900, a host I/O command is transmitted through a straight route from the RoC 801a to the EXP 803a in the expanded enclosure DE#002, so that the system operates. Accordingly, at the completion of the incorporation of the CM #00 into the related-art storage controlling system 900, broadcasts are performed on the same route as that the host I/O command is transmitted through.

Consequently, even if the interface DI#01 has no abnormality as described above, a host I/O command is affected by the broadcasts performed during incorporation of the EXPs 803a. Disadvantageously, the performance of the system is deteriorated.

SUMMARY

According to an aspect of the invention, a storage system includes a plurality of first expanders for connecting a plurality of storage units, each of the plurality of first expanders being connected cascade each other, a plurality of second expanders for connecting the plurality of storage units, each of the plurality of second expanders being connected cascade each other, a first controller connected one of the plurality of first expanders, one of the plurality of second expanders and a host, a second controller connected the one of the plurality of second expanders, the one of the plurality of first expanders and the host, the second controller detecting a failure of at least one of the first controller, the plurality of first expanders and the plurality of second expanders, the second controller selectively controlling a first boot sequence which boots the first controller after the plurality of first expanders have been booted and a second boot sequence which boots the first controller before the plurality of first expanders have been booted, determining one of the first boot sequence and the second boot sequence on the basis of a place where a failure has occurred in a recovery process.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENT

A storage controlling system and a storage controlling device according to embodiments of the present invention will be described below with reference to the drawings.

The storage system has been made in consideration of the above-described disadvantages. The storage system of an object of the embodiment is to provide a storage controlling system in which during recovery of a control apparatus and a storage-apparatus connecting section, the control apparatus is certainly recovered and degradation in the performance of the system is prevented.

Note that the object of the embodiment is not limited to the above-described one and other objects of the embodiment may include an object to provide an advantage that is derived from each component illustrated in an embodiment, which will be described below, for embodying the invention and that is not obtained from related art.

The disclosed storage system provides at least one of the following advantages.

(1) When a request to access to a storage apparatus is given by an upper-level apparatus, this access request can be reliably processed, thus providing high reliability.

(2) When each of a control apparatus and a storage-apparatus connecting section is recovered from its isolated status, the control apparatus is not affected by the recovery of the storage-apparatus connecting section, thus preventing degradation in performance.

(A) Explanation of Embodiments

Figure 1:
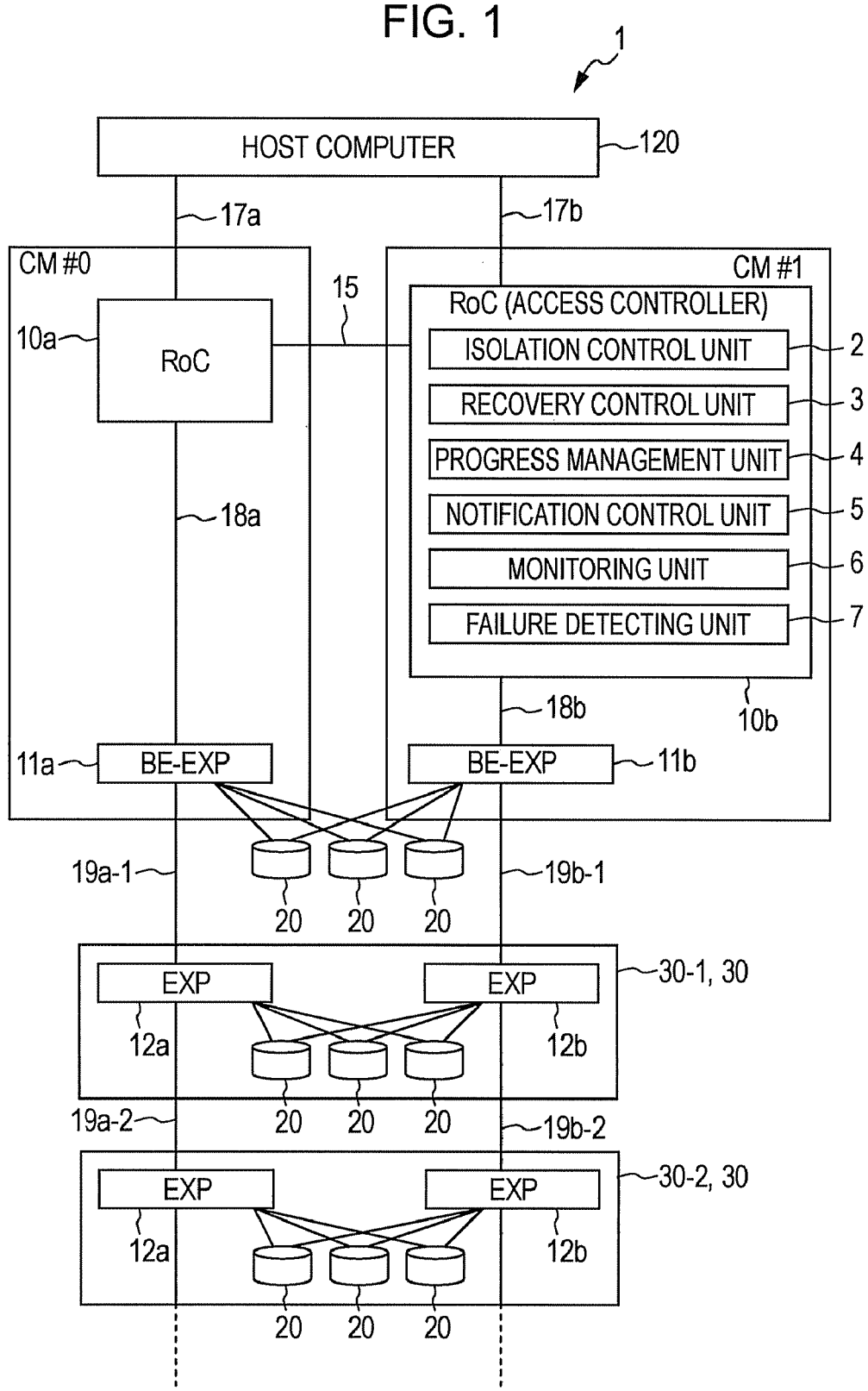
FIG. 1 is a diagram schematically illustrating the functional configuration of a storage controlling system according to an embodiment of the present invention.
Figure 2:
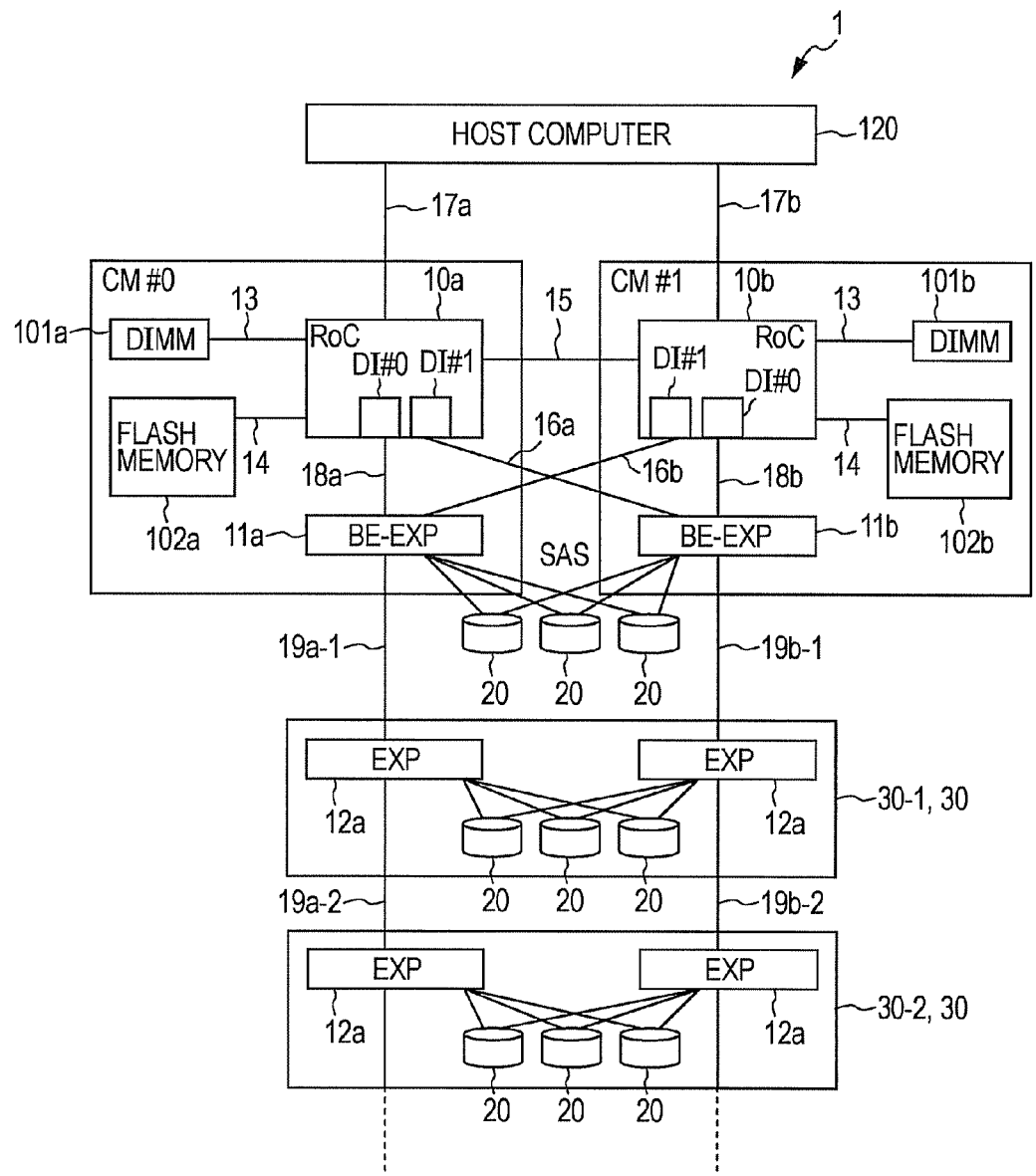
FIG. 2 is a diagram illustrating the hardware configuration of the storage controlling system according to the embodiment.

FIG. 1 schematically illustrates the functional configuration of a storage controlling system according to an embodiment of the present invention. FIG. 2 schematically illustrates the hardware configuration thereof.

The storage controlling system, indicated at 1, is a RAID system including arrays of storage apparatuses 20. Referring to FIG. 1, the storage controlling system 1 is connected to a host computer 120 which serves as an upper-level apparatus.

The storage controlling system 1 performs processing, e.g., reads or writes data from/to a storage apparatus 20 in accordance with an input or output request (e.g., a read command or a write command) from the host computer 120. In some cases, an input or output request from the host computer 120 is called a host I/O command.

Referring to FIG. 2, the storage controlling system 1 includes a plurality of (in this embodiment, two) control modules (CMs) #0 and #1 and a plurality of expanded enclosures 30-1 and 30-2.

Each of the expanded enclosures 30-1 and 30-2 includes one or more (three in the embodiment illustrated in FIGS. 1 and 2) storage apparatuses 20 and provides storage areas of these storage apparatuses 20 to the storage controlling system 1.

Each storage apparatus 20 is configured to store various data and programs such that the data and programs are readable, and includes, for example, a hard disk drive (HDD). In the storage controlling system 1, a plurality of storage apparatuses 20 are arranged in an array to form RAID.

As for the storage apparatuses 20, various storage apparatuses are available. This embodiment will be described with respect to a case where serial attached SCSI (SAS) disks connected on the basis of the SAS standard are used as the storage apparatuses 20.

Each of the expanded enclosures 30-1 and 30-2 includes EXPs 12a and 12b.

The EXPs 12a and 12b are connected to one or more common storage apparatuses 20 and control access to the storage apparatuses 20 in accordance with disk access commands transmitted from RoCs 10a and 10b, respectively. Specifically, the EXPs 12a and 12b each function as a storage-apparatus connecting section (first storage-apparatus connecting section) to which the storage apparatuses 20 are connected.

In the following description, reference numeral 12a or 12b is used when it is necessary to specify one of EXPs. To indicate any EXP, reference numeral 12 is used.

In each of the expanded enclosures 30-1 and 30-2, the EXPs 12a and 12b are connected to one or more (three in the embodiment illustrated in FIGS. 1 and 2) common storage apparatuses 20. Each of the EXPs 12a and 12b can access these storage apparatuses 20 to read and write data to/from the apparatuses. Specifically, each of the EXPs 12a and 12b is connected to the one or more storage apparatuses 20, thus duplicating an access path to each storage apparatus 20.

For convenience, the host computer 120 side that is a transmission source of host I/O commands will be called "upstream side" in the storage controlling system 1 and the destination side to which a disk access command generated based on a disk access command is transmitted will be called "downstream side".

The expanded enclosure 30-1 is placed downstream of the CMs #0 and #1. The EXP 12a in the expanded enclosure 30-1 is connected to a BE-EXP 11a in the CM #0 via a data path 19a-1. The EXP 12b in the expanded enclosure 30-1 is connected to a BE-EXP 11b in the CM #1 via a data path 19b-1.

The expanded enclosure 30-2 is placed downstream of the expanded enclosure 30-1. The EXP 12a in the expanded enclosure 30-2 is connected to the EXP 12a in the expanded enclosure 30-1 via a data path 19a-2. In addition, the EXP 12b in the expanded enclosure 30-2 is connected to the EXP 12b in the expanded enclosure 30-1 via a data path 19b-2.

Hereinafter, the expanded enclosure 30-1 including the EXPs 12a and 12b and the expanded enclosure 30-2 including the EXPs 12a and 12b will also be indicated at DE#01 and DE#02, respectively, and the CMs #0 and #1 will also be indicated at DE#00.

The CM (control apparatus) #0 includes the RoC 10a, the BE-EXP 11a, a dual inline memory module (DIMM) 101a, and a flash memory 102a. The CM (control apparatus) #1 includes the RoC 10b, the BE-EXP 11b, a DIMM 101b, and a flash memory 102b.

Since the CMs #0 and #1 have substantially the same configuration and functions, the CM #0 will be described below as a typical example. The CM #1 will be explained appropriately. In other words, the RoCs 10a and 10b have the same configuration and functions, the BE-EXPs 11a and 11b have the same configuration and functions, the DIMMs 101a and 101b have the same configuration and functions, and the flash memories 102a and 102b have the same configuration and functions.

In the following description, reference numeral #0 or #1 is used when it is necessary to specify one of the CMs. To indicate any CM, it is simply indicated by "CM".

In addition, when it is necessary to specify one of the RoCs, reference numeral 10a or 10b is used. To indicate any RoC, it is indicated at 10.

Similarly, when it is necessary to specify one of the BE-EXPs, reference numeral 11a or 11b is used. To indicate any BE-EXP, it is indicated at 11. In addition, when it is necessary to specify one of the DIMMs, reference numeral 101a or 101b is used. To indicate any DIMM, it is indicated at 101. Furthermore, when it is necessary to specify one of the flash memories, reference numeral 102a or 102b is used. To indicate any flash memory, it is indicated at 102.

The DIMM 101 is a storage area to temporarily store various data and a program when a central processing unit (CPU) (not illustrated) in the RoC 10 executes the program, and functions as a main storage. The DIMM 101 is connected to the RoC 10 in the same CM via a data path 13. This data path 13 is based on, for example, DDR2-553 Standard.

The flash memory 102 stores a program executed by the CPU included in the RoC 10 and various data used upon execution of this program. The flash memory 102 is connected to the RoC 10 in the same CM via a data path 14. The data path 14 is based on, for example, PBI Standard.

The BE-EXP 11 is a component that is connected to one or more common storage apparatuses 20 and controls access to the storage apparatuses 20 in accordance with a disk access command transmitted from the RoC 10. In other words, the BE-EXP 11 functions as a second storage-apparatus connecting section connected to the storage apparatuses 20.

The BE-EXPs 11a and 11b are connected to one or more (three in FIGS. 1 and 2) common storage apparatuses 20. Each of the BE-EXPs 11a and 11b can read and write data from/to the storage apparatuses 20. In other words, each of the BE-EXPs 11a and 11b is connected to the one or more storage apparatuses 20, thus duplicating an access path to each storage apparatus 20.

The RoC 10 performs various controls in the CMs #0 and #1 and functions as an access controller to control access to the storage apparatuses 20.

The RoC 10 generates a disk access command to each storage apparatus 20 provided for the storage controlling system 1 on the basis of a host I/O command transmitted from the host computer 120.

The RoC 10 transmits the disk access command to the BE-EXP 11a or 11b and the EXP 12a or 12b which are relevant to a target storage apparatus 20.

The RoC 10 includes two interfaces DI#0 and DI#1. In the RoC 10a, the interface DI#0 is connected to the BE-EXP 11a via a data path 18a and the interface DI#1 is connected to the BE-EXP 11b in the CM #1 via a data path 16a.

Similarly, in the RoC 10b, the interface DI#0 is connected to the BE-EXP 11b via a data path 18b and the interface DI#1 is connected to the BE-EXP 11a in the CM #0 via a data path 16b.

In other words, in the storage controlling system 1, the RoC 10a in the CM #0 is connected to the BE-EXP 11b in the other CM #1 through the interface DI#1 and the RoC 10b in the other CM #1 is connected to the BE-EXP 11a in the CM #0 through the interface DI#1 (cross connection).

Accordingly, the RoC 10a is connected to the BE-EXP 11a included in the same CM #0 and the BE-EXP 11b in the other CM #1 such that the BE-EXPs 11a and 11b are parallel to each other. Similarly, the RoC 10b is connected to the BE-EXP 11b included in the same CM #1 and the BE-EXP 11a in the other CM #0 such that the BE-EXPs 11b and 11a are parallel to each other.

Hereinafter, a route between the interface DI#0 in the RoC 10 through the BE-EXP 11 to the EXP 12 via the data path 18a or 18b will be called a "straight line". In addition, a route between the interface DI#1 in the RoC 10 through the BE-EXP 11 to the EXP 12 via the data path 16a or 16b will be called a "cross line". Furthermore, the interface DI#1 in the RoC 10 connected to the cross line will also be called a "cross port".

The RoCs 10a and 10b are connected to each other via a data path 15 such that they can communicate with each other. The data path 15 is based on, for example, the PCI Express standard.

The RoC 10 further includes the CPU (not illustrated) which executes a program or firmware stored in, for example, the flash memory 102 so that the RoC 10 functions as an isolation control unit 2, a recovery control unit 3, a progress management unit 4, a notification control unit 5, a monitoring unit 6, and a failure detecting unit 7. The RoC 10 may executes the program to each other.

The program to achieve the functions of the isolation control unit 2, the recovery control unit 3, the progress management unit 4, the notification control unit 5, the monitoring unit

6, and the failure detecting unit 7 is provided in the form of a computer-readable recording medium, e.g., a flexible disk, a compact disk (CD) such as a CD-ROM, a CD-R, or a CD-RW, a digital versatile disk (DVD) such as a DVD-ROM, a DVD-RAM, a DVD-R, a DVD+R, a DVD-RW, a DVD+RW, or a high definition (HD) DVD, a Blu-ray Disc, a magnetic disk, an optical disk, or a magneto-optical disk in which the program is recorded. A computer reads the program from the recording medium, transfers the read program to an internal storage apparatus or an external storage apparatus to store the program into the storage apparatus, and uses the stored program. The program may be recorded in a storage apparatus (recording medium) such as a magnetic disk, an optical disk, or a magneto-optical disk and the storage apparatus may provide the recorded program to the computer via a communication path.

To achieve the functions of the isolation control unit 2, the recovery control unit 3, the progress management unit 4, the notification control unit 5, the monitoring unit 6, and the failure detecting unit 7, the program stored in the internal storage apparatus (e.g., the flash memory 102) is implemented by a microprocessor (the CPU in the present embodiment) of the computer. At this time, the program recorded in the recording medium may be read and implemented by the computer.

In the present embodiment, the computer is a concept including hardware and an operating system and means hardware operating under the control of the operating system. In a case where any operating system is not needed and an application program alone operates hardware, the hardware itself corresponds to a computer. Hardware includes at least a microprocessor such as a CPU and means for reading a computer program recorded in a recording medium. In the present embodiment, the RoC 10 has a function that serves as a computer.

Referring to FIG. 1, for convenience, the functional units are illustrated in only the RoC 10*b*. Although the functional units in the RoC 10*a* are not illustrated, the RoC 10*a* has the same functions as those of the RoC 10*b*.

The monitoring unit 6 detects the occurrence of a status change in, for example, the hardware configuration or the software configuration in the storage controlling system 1. For example, when any CM or EXP 12 is disabled (which will be described below) or disconnected, alternatively, when the CM or EXP 12 is recovered, the monitoring unit 6 detects the occurrence of such an event.

The failure detecting unit 7 detects the occurrence of a failure in the storage controlling system 1. A method of detecting such a failure can be realized by any of various known methods. For example, when the connection between the RoC 10 and a target EXP 12 is not established, the failure detecting unit 7 detects the occurrence of some failure on the route to the target EXP 12. In addition, the failure detecting unit 7 specifies a portion where the failure has occurred on the basis of a range where the connection therebetween is established on the route.

When the failure detecting unit 7 detects the occurrence of a failure, a notification indicating the fact that the failure has occurred is transmitted to the isolation control unit 2, the recovery control unit 3, and a control terminal (not illustrated). Information indicating a place where the failure has occurred is added to this notification.

The isolation control unit 2 performs control upon occurrence of a failure in the storage controlling system 1 so as to isolate the CM, the BE-EXP 11, or the EXP 12 relevant to the failure. For example, the CM or the EXP 12 relevant to the failure is disconnected from the data path so that data access is prevented, so that the CM or the EXP 12 is isolated. Setting a component in the storage controlling system 1 to an isolated status will also be called "disabling". Upon disconnection, power supply to the target EXP 12 or the like may be interrupted. Disconnection by the isolation control unit 2 can be performed using any of various known methods.

For example, if both of the EXPs 12*a* and 12*b* are disconnected in the expanded enclosure DE#01, this means that the expanded enclosure DE#01 is blocked. When the expanded enclosure DE#01 is blocked, access to the expanded enclosure DE#02 downstream of the blocked enclosure is also interrupted.

When the isolation control unit 2 disables the CM, the access route to the BE-EXP 11 and the EXPs 12 on the straight line extending from the interface DI#0 is closed. Accordingly, the BE-EXP 11 and the EXPs 12 on the straight line extending from the interface DI#0 in the CM are also disabled.

The progress management unit 4 manages the progress of each incorporation target, e.g., the CM or the EXP 12 subjected to the incorporating process by the recovery control unit 3. The progress management unit 4 sets any of three types of information, e.g., "WAIT", "READY", and "ONLINE" as recovery status information ("EXP Status") relevant to each incorporation target to manage the progress.

"WAIT" means a status in which the incorporating process is not completed. "ONLINE" means a status in which the target EXP 12 has already been incorporated and the CM on the same straight line has also been incorporated.

"READY" means a status in which the EXP 12 has already been incorporated but the incorporating process on the CM on the same straight line is not completed.

The recovery control unit 3 determines that the EXP 12 which satisfies the following conditions (1) to (4) is "READY".

(1) The EXP 12 can be recognized on a SAS interface.
(2) The EXP 12 is an incorporation target.
(3) When the EXP 12 is a component (e.g., the EXP 12 in the expanded enclosure DE#01) directly connected to the CM, the status of the incorporating process on the CM is an EXP-incorporation possible status.
(4) When the EXP 12 is a component (e.g., the EXP 12 in the expanded enclosure DE#02) connected to another EXP 12, the other EXP 12 is in the normal status or has been incorporated during total incorporation.

The progress management unit 4 updates the recovery status information on the basis of the progress of recovery by the recovery control unit 3, which will be described below.

The above-described recovery status information is stored in a predetermined area in, for example, the DIMM 101*b* or a storage apparatus (not illustrated). As for the recovery status information, a status corresponding to any of the three types, i.e., "WAIT", "READY", and "ONLINE" may be set and stored in the form of a flag.

The recovery control unit 3 performs the incorporating process of recovering each of the CM, the BE-EXP 11, and the EXP 12 which are disabled by the isolation control unit 2 from its disabled status and incorporating the recovered component into the storage controlling system 1.

In this incorporating process, for example, the physical connection and the version number of firmware are confirmed. In addition, the recovery control unit 3 notifies the progress management unit 4 of the progress.

When recovering the CM disabled by the isolation control unit 2 or each EXP 12 on the same straight line from its disabled status, the recovery control unit 3 operates selectively in either of the following two recovery control modes.

In the first recovery control mode, the EXPs 12 are recovered from the isolated status before or simultaneously with the recovery of the CM. In the second recovery control mode, the EXP 12s are recovered after the CM is recovered.

In the first recovery control mode, if the incorporation of the EXPs 12 is completed, the recovery control unit 3 does not immediately change the status of the EXP 12 to the normal status ("ONLINE") and temporarily sets the status of the EXP 12 to an incorporation preparation complete status ("READY"). After that, the recovery control unit 3 changes the status of each EXP 12 to the normal status at the same time when the incorporation of the CM is completed and the status of the CM is shifted to the normal status. The recovery control unit 3 therefore permits reception of a host I/O command.

In other words, the recovery control unit 3 adjusts the timing of recoveries of the CM and the EXPs 12 on the basis of the recovery status information (progress) managed by the progress management unit 4.

FIGS. 3 to 6 are diagrams explaining the first recovery control mode in the storage controlling system in the present embodiment.

Assuming that the CM #0 and the EXPs 12 downstream of the CM #0 on the same straight line are disabled, a process of recovering the CM #0 and the EXPs 12 will now be described with reference to FIGS. 3 to 6.

In the first recovery control mode, when incorporating the CM, the recovery control unit 3 provides the timing of incorporating the EXPs 12 on the same straight line as the CM before the incorporation of the CM, thus preventing the CM from being incorporated before the incorporation of the EXPs 12.

Figure 3:
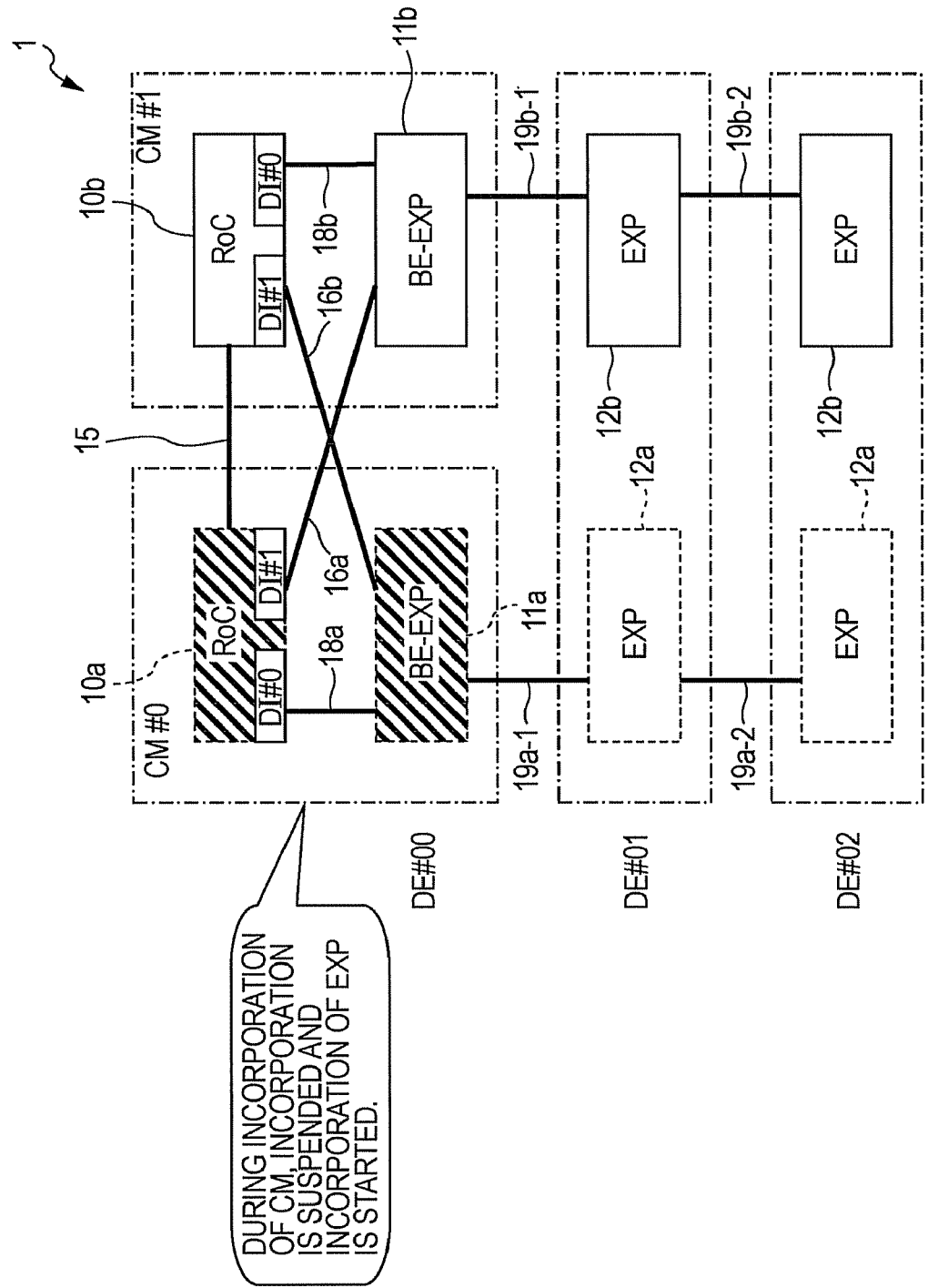
FIG. 3 is a diagram explaining a first recovery control mode in the storage controlling system according to the embodiment.

Specifically, as shown in FIG. 3, during incorporation of the CM #0, the incorporating process is temporarily suspended before completion of the process, namely, before the progress management unit 4 sets the status of the CM #0 to "ONLINE".

Figure 4:
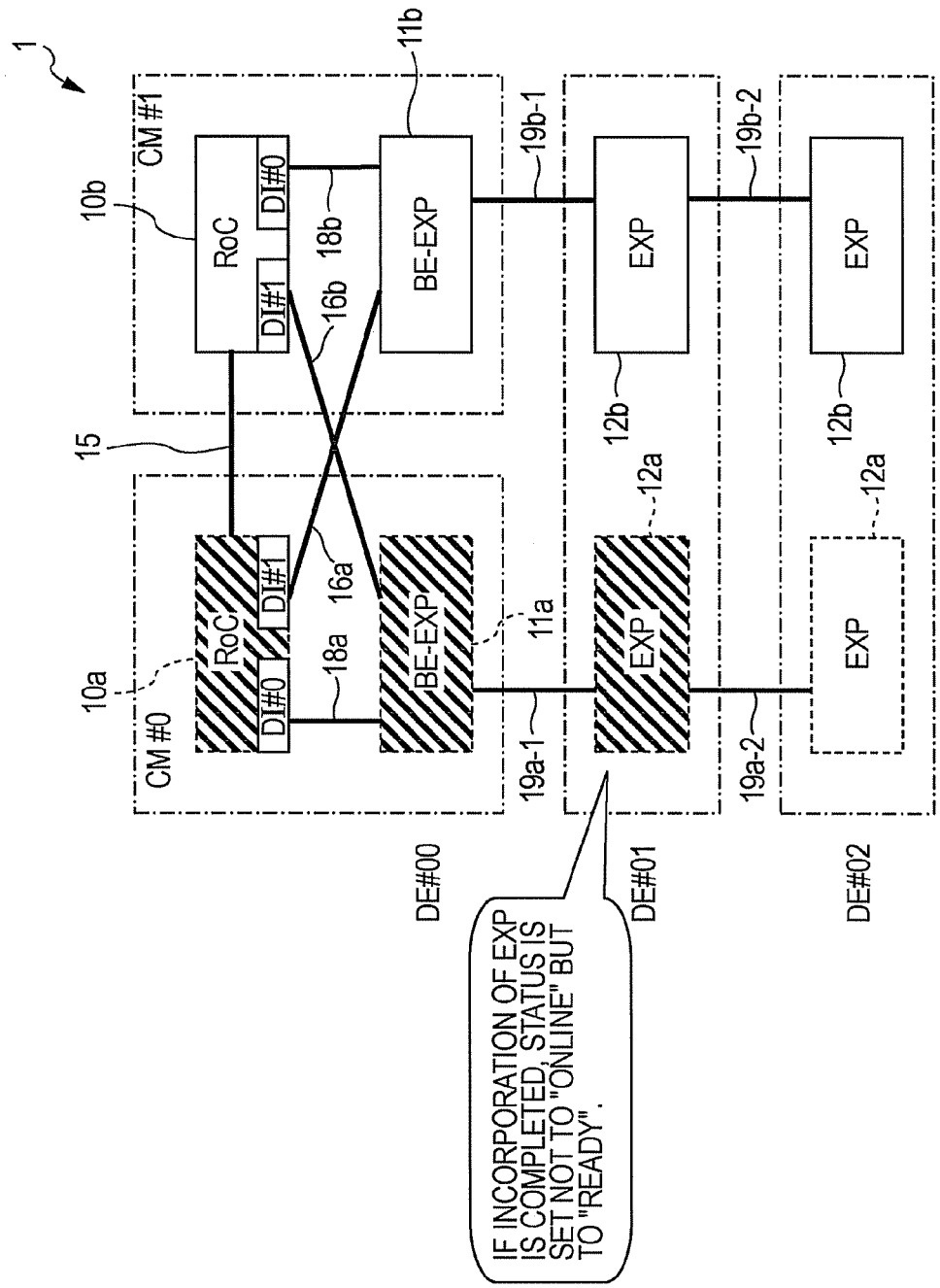
FIG. 4 is a diagram explaining the first recovery control mode in the storage controlling system according to the embodiment.

While the incorporation of the CM #0 is suspended, namely, while the status of the CM #0 set by the progress management unit 4 is "READY", the recovery control unit 3 starts incorporating the EXP 12a in the expanded enclosure DE#01, as shown in FIG. 4. When the incorporation of the EXP 12a is completed, the progress management unit 4 sets the status of the EXP 12a in the expanded enclosure DE#01 to "READY" instead of "ONLINE".

Figure 5:
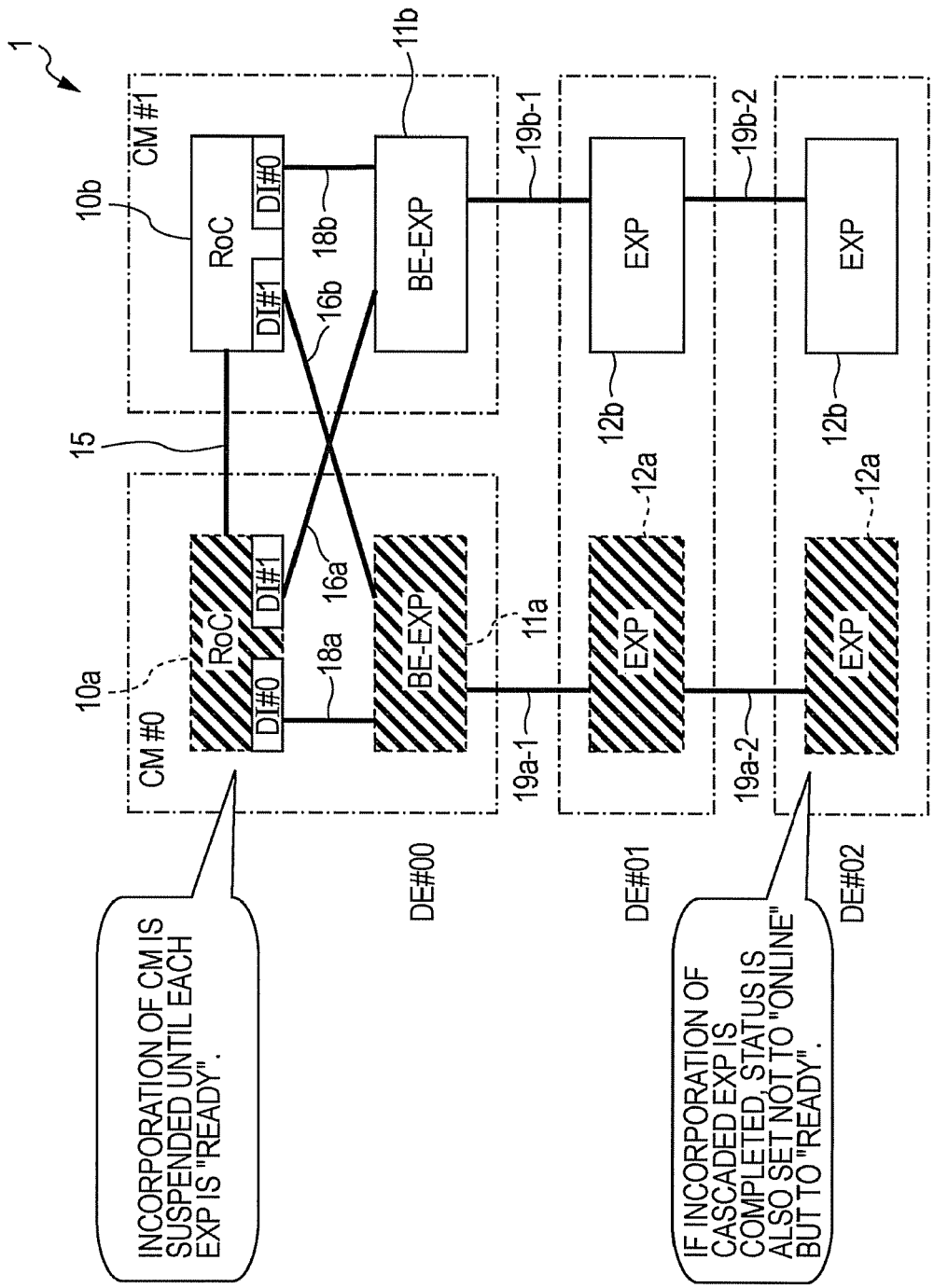
FIG. 5 is a diagram explaining the first recovery control mode in the storage controlling system according to the embodiment.

After that, the recovery control unit 3 incorporates the cascaded EXP 12a in the expanded enclosure DE#02, as shown in FIG. 5. When the incorporation of the cascaded EXP 12a is completed, the progress management unit 4 sets the status of the EXP 12a in the expanded enclosure DE#02 to "READY" instead of "ONLINE".

On the other hand, the incorporation of the CM is suspended until the status of each of the EXPs 12 indicates "READY".

Figure 6:
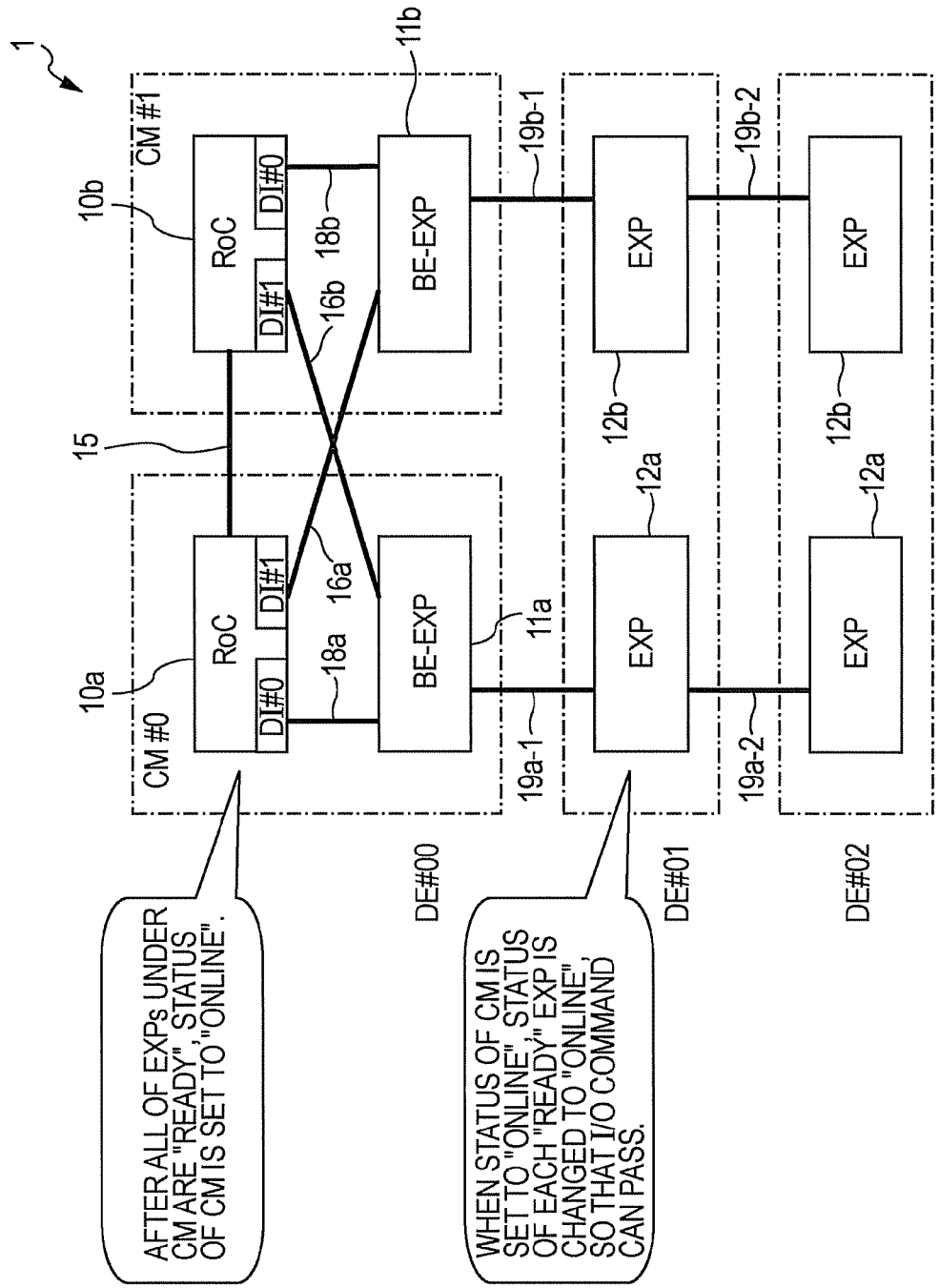
FIG. 6 is a diagram explaining the first recovery control mode in the storage controlling system according to the embodiment.

The statuses of all of the EXPs 12 under the CM #0, namely, on the same straight line as the CM #0 are set to "READY" by the progress management unit 4, as shown in FIG. 6, the recovery control unit 3 rewrites the progress of the CM #0 to "ONLINE".

In addition, the recovery control unit 3 changes the statuses of all of the EXPs 12 under the CM #0 to "ONLINE" at the time when the status of the CM #0 is changed to "ONLINE" in the progress management unit 4.

Consequently, the CM #0 and the EXPs 12 downstream of the CM #0 are incorporated into the system at the same time, so that a disk access command based on a host I/O command can pass the straight line relevant to the CM #0.

In the second recovery control mode, after the incorporation of the CM is completed, the recovery control unit 3 sequentially recovers the EXPs 12 on the same straight line as this CM in the order from the upstream EXP close to the CM. The second recovery control mode has advantages in that a data path can be recovered for a short time. In other words, the time required to make a data path redundant can be reduced, thus increasing the reliability of the system. In addition, since a method related to the second recovery control mode has been used, the method is tried and true. Advantageously, the second recovery control mode has high reliability.

Operation in the first recovery control mode or operation in the second recovery control mode may previously be set by a user at will. Setting information indicating the set recovery control mode is stored in the DIMM 101 or a storage apparatus (not illustrated). The recovery control unit 3 operates in either of the recovery control modes in accordance with the setting information.

Alternatively, the recovery control unit 3 may autonomously determine, on the basis of the status of the storage controlling system 1, whether to operate in the first recovery control mode or the second recovery control mode. Then, the recovery control unit 3 may operate in the determined recovery control mode. Such a method of determination will be described later.

Figure 7:
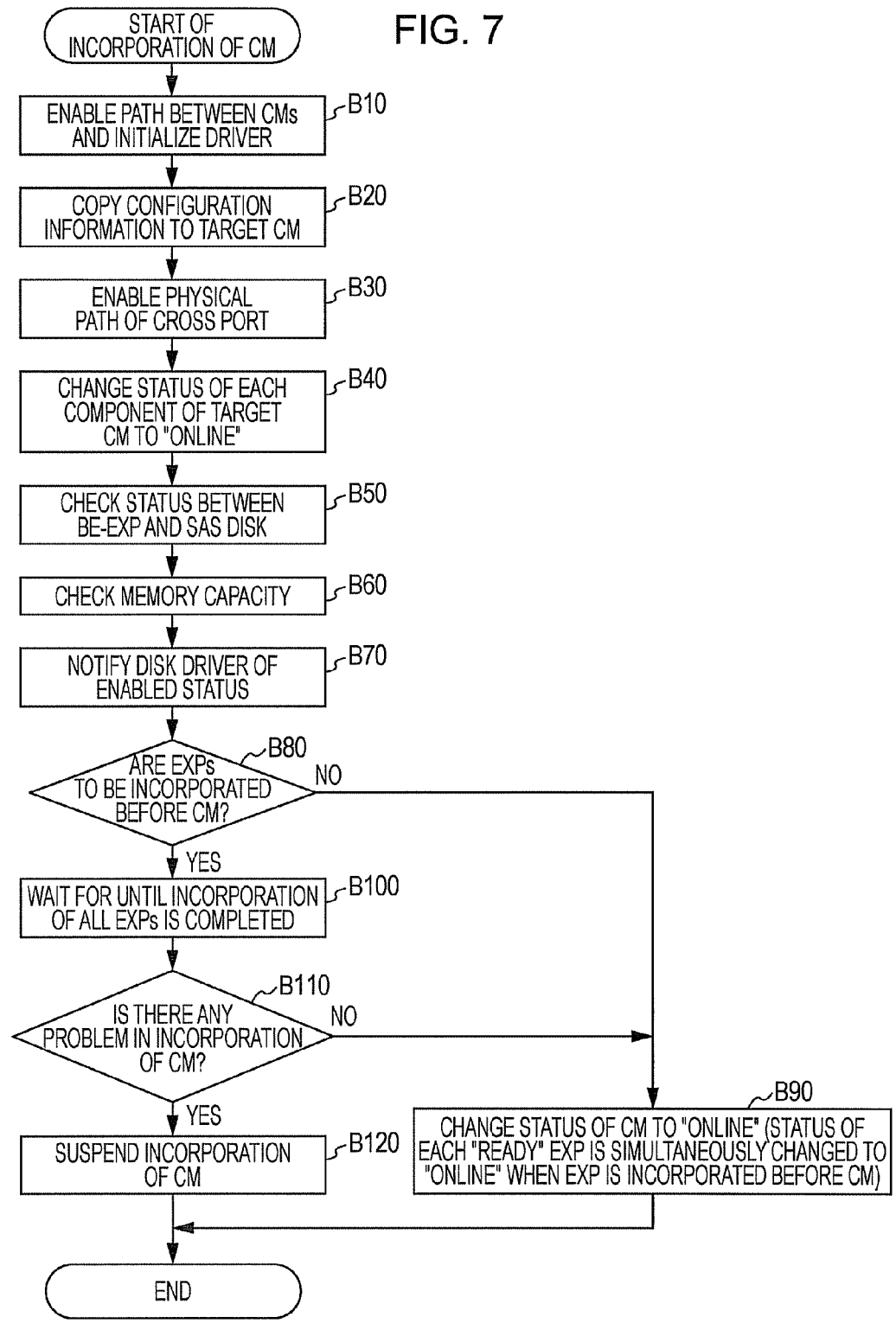
FIG. 7 is a flowchart explaining a process of incorporating a CM in the storage controlling system according to the embodiment.

A process of incorporating a CM into the storage controlling system 1 according to the embodiment will now be described with reference to a flowchart (including B10 to B120) illustrated in FIG. 7.

The recovery control unit 3 enables the data path 15 between the corresponding CM and the CM to be recovered, namely, the target CM to be incorporated. In addition, the recovery control unit 3 initializes a driver of the target CM (B10). Furthermore, the recovery control unit 3 copies configuration information onto the target CM (B20), thus enabling Phy of the cross port (B30). Phy indicates a physical path between an expander and another expander or a disk connected to the expander. The recovery control unit 3 can control enabling/disabling Phy. The recovery control unit 3 enables Phy, thus enabling the corresponding physical path.

The recovery control unit 3 changes the status of each component of the target CM to "ONLINE" (B40) and checks the status between the BE-EXP 11 and each storage apparatus (SAS DISK) 20 (B50). In addition, the recovery control unit 3 checks the memory capacity (B60) and notifies a disk driver of the enabled status (B70). At this time, the status of the target CM is set to "READY" in the progress management unit 4.

The recovery control unit 3 determines whether to incorporate the EXPs 12 first before the target CM, namely, whether to operate in the first recovery control mode (B80). If the EXPs 12 are to be incorporated first (YES in B80), the EXPs 12 are sequentially incorporated, thus completing the incorporation of all of the target EXPs 12 (B100).

Subsequently, the recovery control unit 3 determines whether there is any problem in the incorporation of the CM (B110). If it is determined that there is any problem in the incorporation of the CM (YES in B110), the incorporation of the CM is suspended (B120). The process is terminated.

Whereas, if it is determined that there is no problem in the incorporation of the CM (NO in B110), the status of the CM is changed to "ONLINE" in the progress management unit 4. In addition, when the EXPs are to be incorporated first (the first recovery control mode), the status of each EXP 12 that is "READY" is changed to "ONLINE" simultaneously with the change of the status of the CM in the progress management unit 4 (B90). In other words, at the time when the incorporation of the CM is completed, the EXPs 12 under the CM are searched for. As for each EXP 12 which has been incorporated, namely, whose set status is "READY", the status of the EXP 12 is also changed at the same time as that when the status of the CM is changed. After that, the process is terminated. If the EXPs 12 are not to be incorporated first (NO in B80), the process proceeds to B90.

Figure 8:
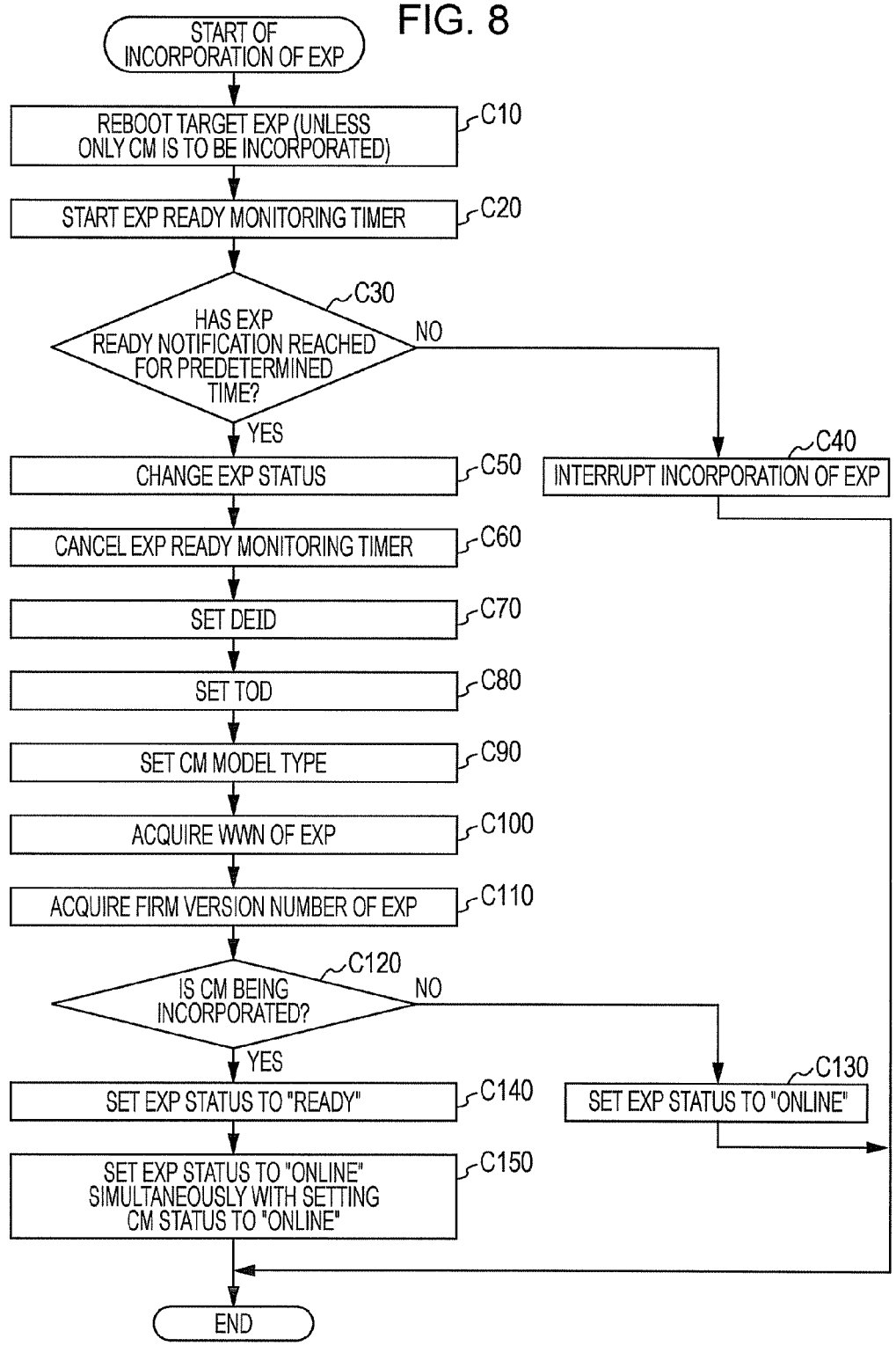
FIG. 8 is a flowchart explaining a process of incorporating an EXP in the storage controlling system according to the embodiment.

A process of incorporating an EXP into the storage controlling system 1 according to the embodiment will now be described with reference to a flowchart (including C10 to C150) illustrated in FIG. 8.

The recovery control unit 3 first reboots a target EXP 12 to be incorporated (C10). If only the CM is to be incorporated, rebooting the EXP 12 is not performed.

To monitor the transmission of EXP READY notification from the EXP 12, the recovery control unit 3 starts an EXP READY monitoring timer (C20). This EXP READY notification is information indicating the completion of boot-up of the EXP 12.

In addition, the recovery control unit 3 determines whether the EXP READY notification has reached the CM for a predetermined time (C30). If the EXP READY notification has not reached for the predetermined time (NO in C30), the incorporation of the EXP 12 is interrupted (C40). The process is terminated.

If the EXP READY notification has reached the CM for the predetermined time (YES in C30), the CM changes an EXP status indicating the status of the EXP 12 (C50). In addition, the CM cancels the EXP READY monitoring timer (C60).

After that, the recovery control unit 3 sets DEID, TOD, and the CM model type related to the EXP 12 (C70 to C90). The DEID is information for identifying the expanded enclosure on which the EXP 12 is mounted.

The recovery control unit 3 acquires the WWN and the firmware version number of the EXP 12 (C100 and C110).

The recovery control unit 3 determines whether the CM is being incorporated (C120). If the CM is not being incorporated (NO in C120), the status of the EXP 12 is set to "ONLINE" in the progress management unit 4 (C130). The process is then terminated.

If the CM is being incorporated (YES in C120), the status of the EXP 12 is set to "READY" in the progress management unit 4 (C140). In the progress management unit 4, the status of the CM is set to "ONLINE" and simultaneously the status of the EXP 12 is also set to "ONLINE" (C150). The process is terminated.

Alternatively, the recovery control unit 3 may autonomously determine, on the basis of the status of the storage controlling system 1 (i.e., a portion where a failure has occurred), whether to operate in the above-described first recovery control mode or the second recovery control mode and operate in the determined recovery control mode.

Figure 9:
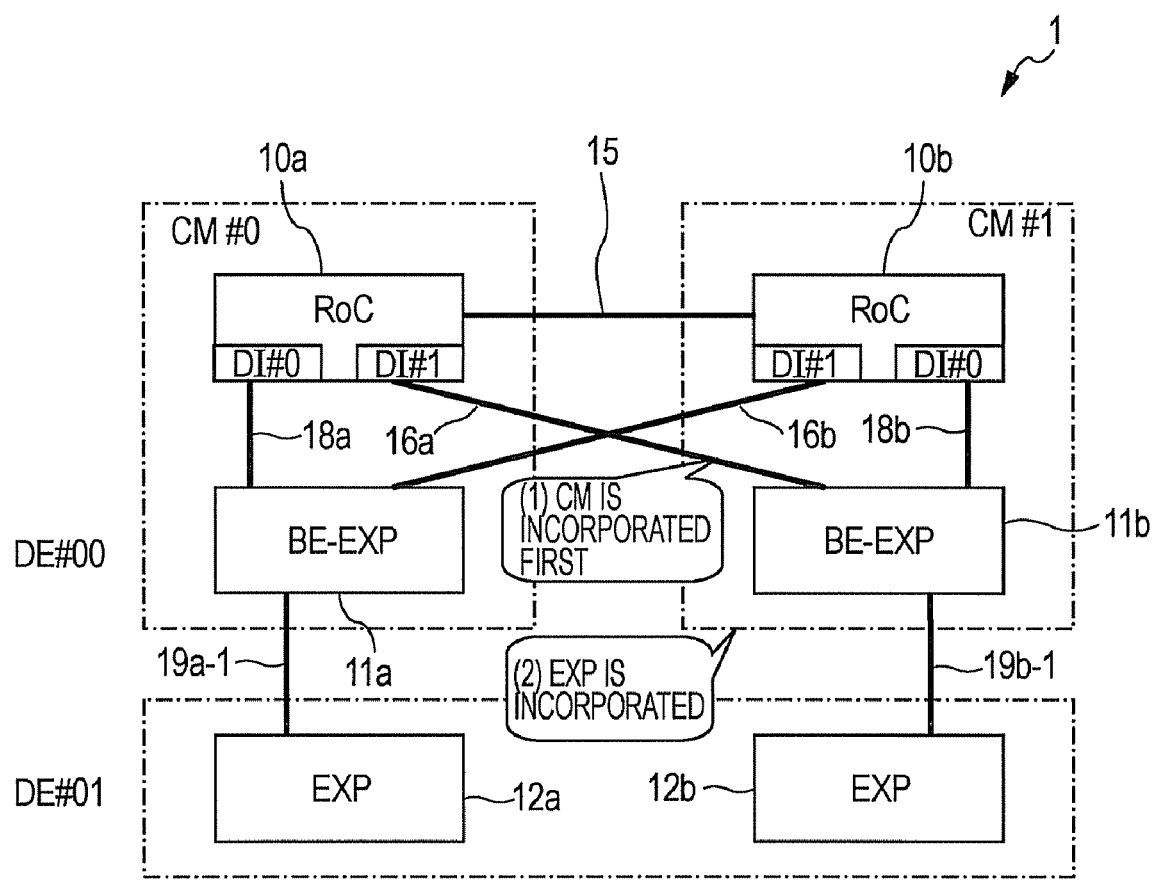
FIG. 9 is a diagram explaining a method of selecting either of recovery control modes in the storage controlling system according to the embodiment.
Figure 10:
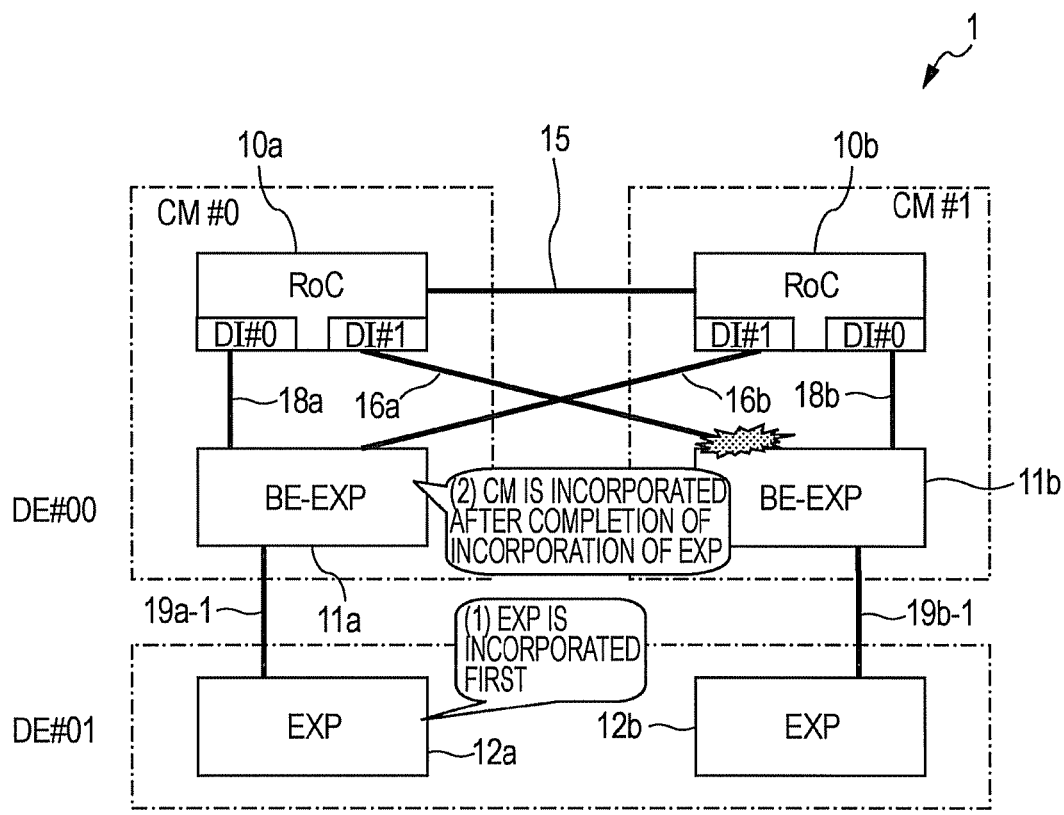
FIG. 10 is a diagram explaining the method of selecting either of the recovery control modes in the storage controlling system according to the embodiment.
Figure 11:
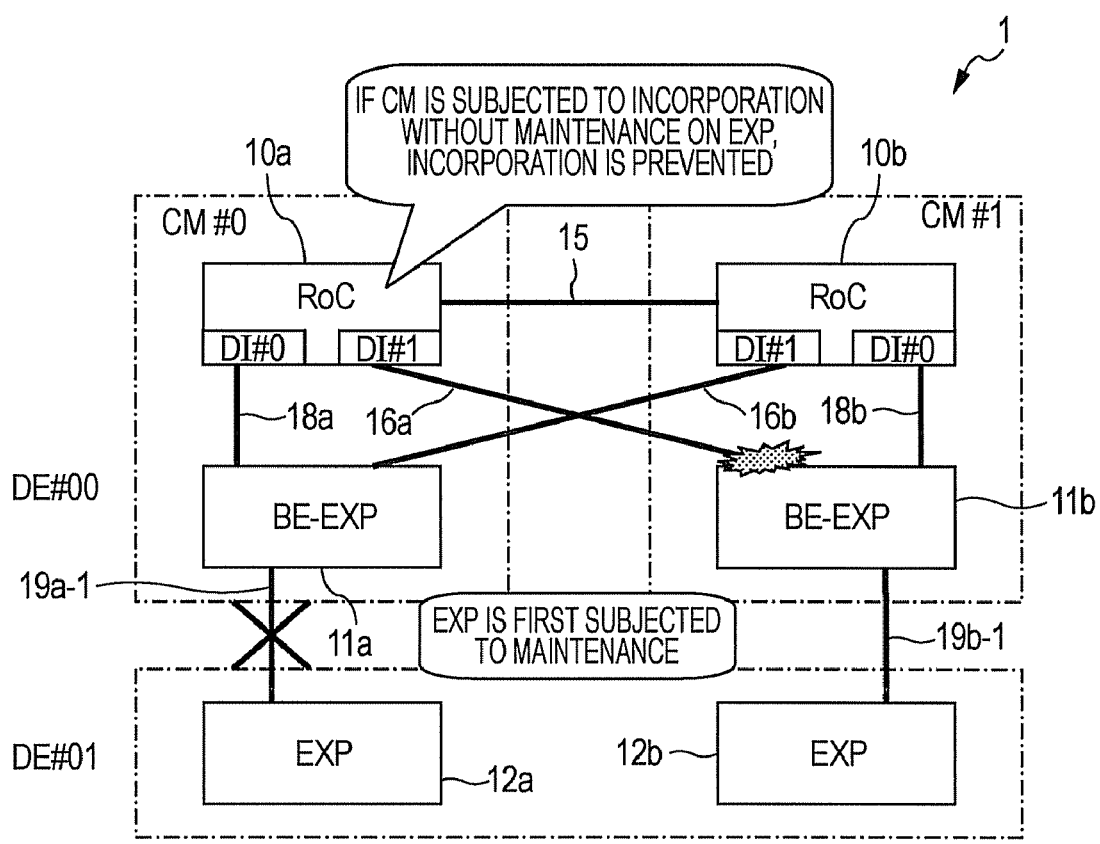
FIG. 11 is a diagram explaining the method of selecting either of the recovery control modes in the storage controlling system according to the embodiment.

FIGS. 9 to 11 are diagrams explaining a method of selecting either of the recovery control modes in the storage controlling system 1 according to the embodiment.

FIGS. 9 to 11 illustrate a case where each EXP 12a under the CM #0 is to be incorporated. In FIGS. 9 to 11, for convenience, the expanded enclosure DE#02 is not illustrated.

In the second recovery control mode, a data path can be recovered for a short time, so that the time required to make the data path redundant can be reduced. It is therefore preferred that the recovery control unit 3 use the second recovery control mode first before the first recovery control mode to incorporate the CM and the EXP 12.

In the second recovery control mode, (1) the CM #0 is incorporated first and (2) the EXP 12a is then incorporated.

For example, when a failure (e.g., an abnormality of the interface DI#1) is detected in the cross line extending from the interface DI#1 of the disabled CM #0, as shown in FIG. 10, the recovery control unit 3 incorporates the CM #0 and the EXP 12a in the first recovery control mode.

Specifically, the recovery control unit 3 operates in the first recovery control mode in a case where a failure has occurred on the path between the RoC 10a in the CM #0 and the BE-EXP 11b in the other CM #1 and a failure has occurred on the path (e.g., the path 19a-1) between the BE-EXP 11a in the same CM #0 as the RoC 10a and the EXP 12a downstream thereof.

In the first recovery control mode, (1) the EXP 12a is incorporated first and (2) the CM #0 is incorporated after the completion of the incorporation of the EXP 12a.

As illustrated in FIG. 11, in a case where a failure is detected on the cross line extending from the interface DI#1 in the disabled CM #0 and a failure is also detected on the straight line extending from the disabled CM #0, i.e., the data path 19a-1 between the CM #0 and the expanded enclosure (hereinafter, also referred to as "expanded DE") 30-1 (DE#01), the EXP 12 in the expanded enclosure 30-1 (DE#01) is subjected to maintenance.

To achieve flexible maintenance, a component with a Fault LED turned on is replaced. If a wrong component is replaced, the entire system may be affected. In the storage controlling system 1, whether there is any problem in incorporation is determined upon component replacement.

In a case where a first failure has occurred on the path (cross line) between the RoC 10 in the disabled CM and the BE-EXP 11 in the other CM and a second failure has occurred on the path between the BE-EXP 11 in the same CM as this RoC 10 and the EXP 12 downstream thereof, the notification control unit 5 performs control so that maintenance request notification related to the second failure is output.

This maintenance request notification is used to request an operator to perform maintenance for the second failure. For example, the notification control unit 5 outputs a command for displaying a message indicating a maintenance request on a display to, for instance, a control terminal (not illustrated), thus realizing maintenance request notification. The maintenance request notification is not limited to such a form and various modifications thereof can be provided in the forms of audio output, an electric mail, and the like to the operator.

In the case illustrated in FIG. 11, after the operator performs maintenance on the EXP 12 in the expanded enclosure 30-1 (DE#01) to remove the failure related to the EXP 12, the storage controlling system 1 enters the status illustrated in FIG. 9. In this status, the recovery control unit 3 incorporates the CM and the EXP 12 in the first recovery control mode.

In the case in FIG. 11, if the operator attempts to incorporate the CM #0 without maintenance on the EXP 12 in the expanded enclosure 30-1 (DE#01), the incorporation of the CM is prevented. It is necessary to first perform maintenance on the EXP 12 in the expanded enclosure 30-1 (DE#01).

The theory of determination related to the incorporating process by the recovery control unit 3 is also used in selection of a target to be isolated, namely, the CM, the BE-EXP 11, or the EXP 12 by the isolation control unit 2. In other words, the isolation control unit 2 determines a target to be disconnected on the basis of a portion where a failure has occurred.

Figure 12:
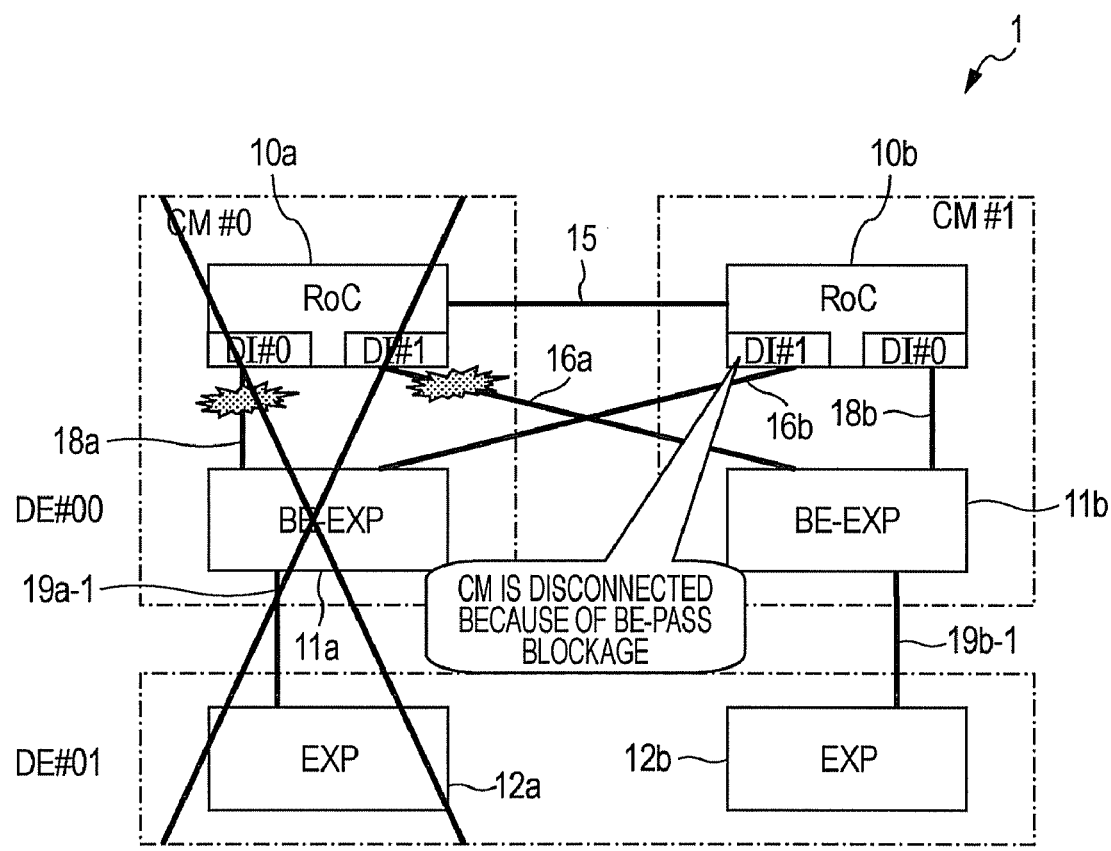
FIG. 12 is a diagram illustrating a method of determination upon disconnection in the storage controlling system according to the embodiment.
Figure 13:
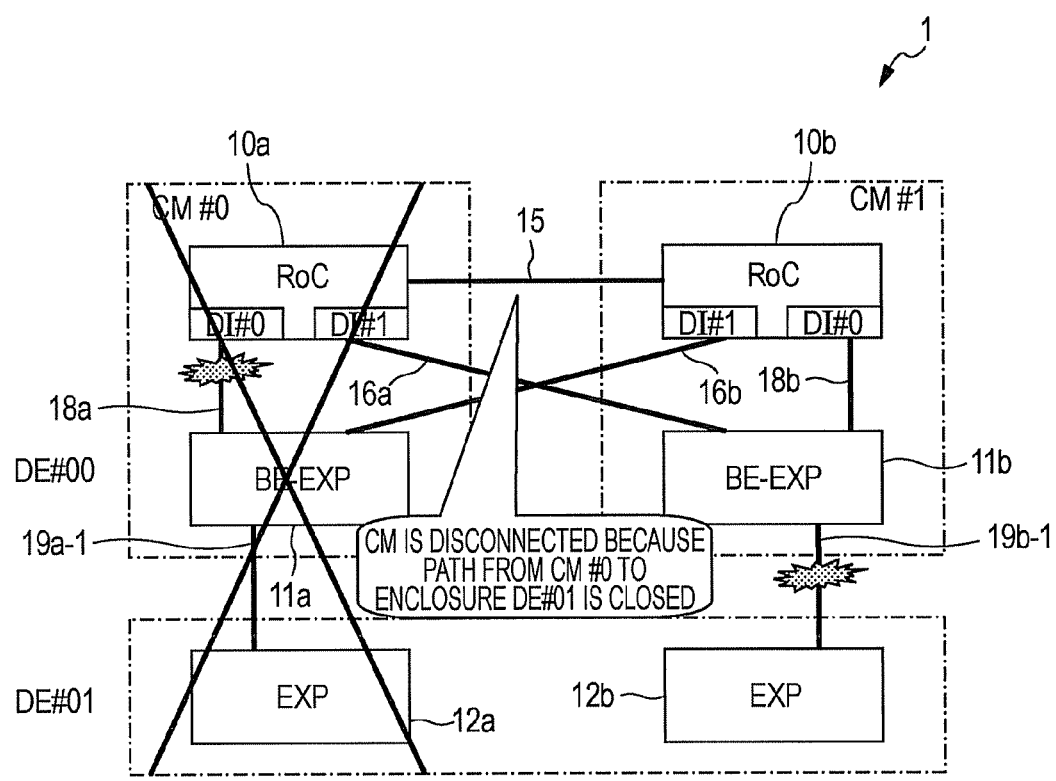
FIG. 13 is a diagram illustrating the method of determination upon disconnection in the storage controlling system according to the embodiment.

FIGS. 12 and 13 are diagrams illustrating a method of determination upon disconnection in the storage controlling system 1 according to the embodiment. In FIGS. 12 and 13, for convenience, the expanded enclosure DE#02 is not illustrated.

For example, in a case where a failure has occurred on each of the data paths 18a and 16a extending from the CM #0, as illustrated in FIG. 12, the BE-EXP 11a is blocked, so that there is no outward pass (BE-PASS) from the CM #0. Accordingly, the isolation control unit 2 disconnects the CM #0 related to the failures.

In a case where a failure has occurred on the data path 19b-1 and another failure has also occurred on the data path 18a, as illustrated in FIG. 13, there is no path from the CM #0 to the expanded enclosure DE#01. Accordingly, the isolation control unit 2 disconnects the CM #0 related to the failures.

An exemplary method of determination in the storage controlling system 1 with the above-described configuration in accordance with the embodiment will now be described along a flowchart (including D10 to D130) illustrated in FIG. 14A and FIG. 14B with reference to FIGS. 15 to 19. FIGS. 15 to 19 illustrate concrete examples of determination branches in FIG. 14A and FIG. 14B.

FIGS. 15 to 19 illustrate cases where the CM #0 or/and at least one EXP 12a downstream thereof are incorporated or disconnected.

Figure 14A:
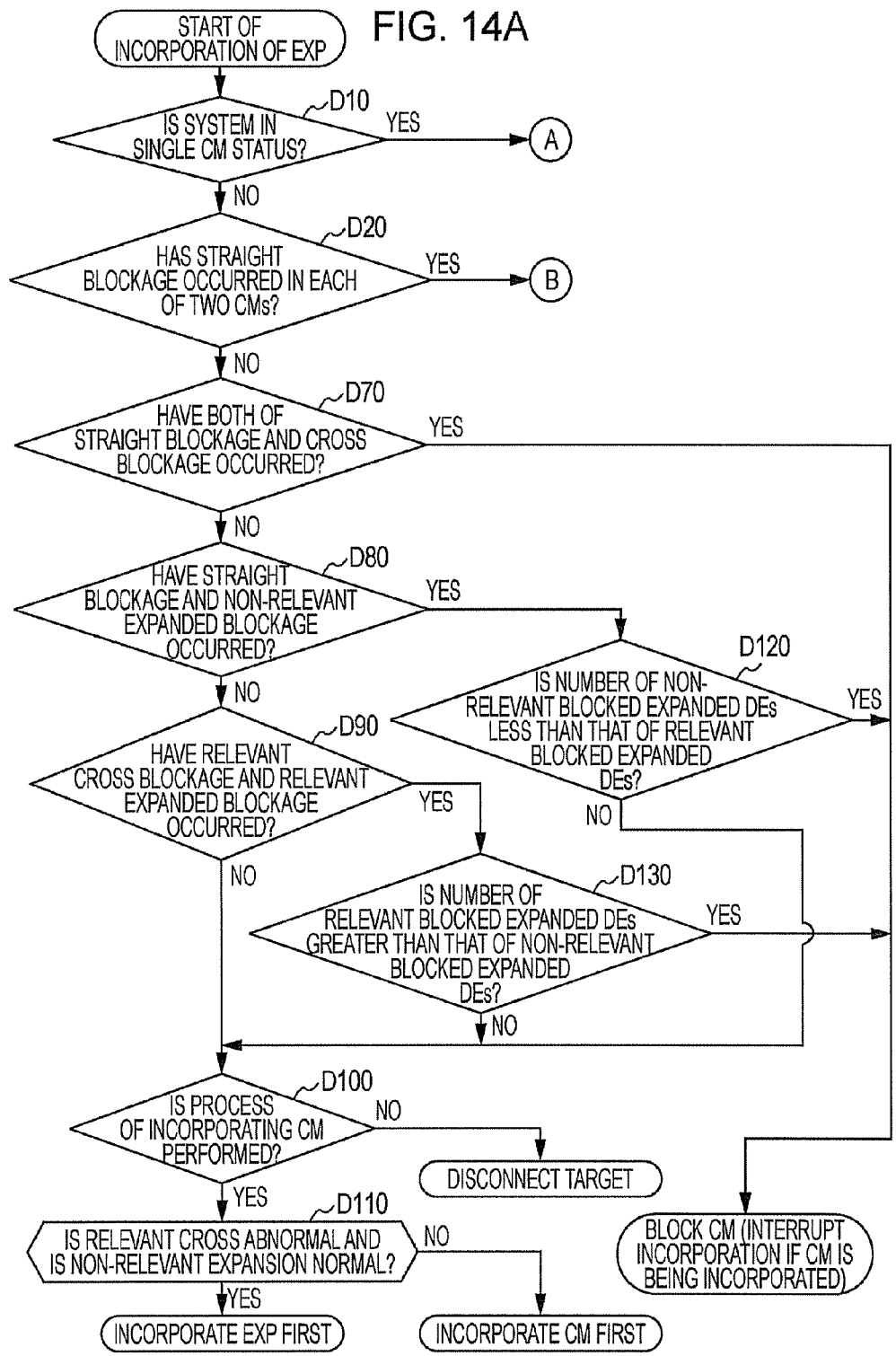
FIG. 14A and FIG. 14B are a flowchart explaining an exemplary process of determination in the storage controlling system according to the embodiment.
Figure 14B:
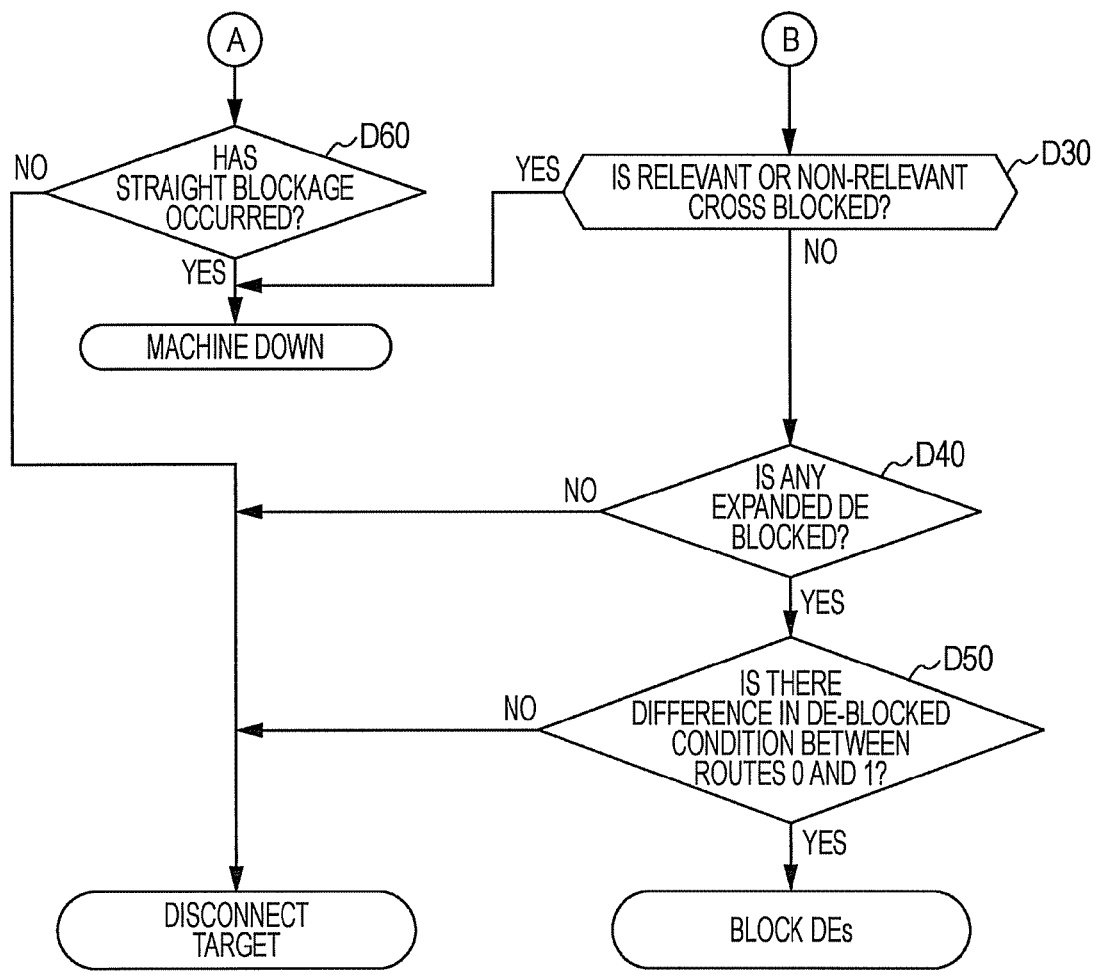

For example, when the recovery control unit 3 incorporates the CM, alternatively, when the failure detecting unit 7 detects a failure and the isolation control unit 2 disconnects a target related to the failure in order to remove the failure, determination is made in accordance with a process illustrated in FIG. 14A and FIG. 14B.

In the case where the CM is to be incorporated in the case in FIG. 14A and FIG. 14B, a series of paths connected to the target CM to be incorporated, namely, the connected paths downstream of the target CM may be called "relevant" route. Whereas, a series of paths connected to the other CM that is not to be incorporated, namely, the connected paths downstream of the other CM may be called "non-relevant" route.

For example, a relevant route of the CM #0 includes the data paths 18a, 19a-1, 19a-2, and 16a and that of the CM #1 includes the data paths 18b, 19b-1, 19b-2, and 16b.

In particular, in each CM, the data path 18a or 18b connected to the interface DI#0 in the RoC 10 may be called "straight" and the data path 16a or 16b connected to the interface DI#1 in the RoC 10 may be called "cross". In addition, locating downstream of the BE-EXP 11 may be expressed "expanded or expansion".

In each CM, a status (blockage) in which the data path 18a or 18b is communication-disabled by any failure will be called "straight blockage". Similarly, a status in which the data path 16a' or 16b is communication-disabled by any failure will be called "cross blockage".

A failure occurrence report made by the failure detecting unit 7 includes information indicating a portion where a failure has occurred. Accordingly, which CM's straight line (route) includes the portion where the failure has occurred can be known.

Upon start of the determining process, the RoC 10 determines whether the storage controlling system 1 operates in a single CM status in which the system operates with only one CM (D10). If the system is in the single CM status (YES in D10), the RoC 10 determines whether a straight blockage has occurred in the other CM that is disabled (D60).

If a straight blockage has occurred (YES in D60), the storage controlling system 1 goes down (machine down). The operator or the like performs maintenance for the failure. Whereas, if any straight blockage does not occur (NO in D60), the target (in this case, the disabled CM) can be disconnected as it is.

If the storage controlling system 1 is not in the single CM status (NO in D10), the RoC 10 determines whether a straight blockage has occurred in each of the two CMs #0 and #1.

If a straight blockage has occurred in each of the two CMs #0 and #1 (YES in D20), the RoC 10 determines whether a blockage has occurred on the relevant cross or the non-relevant cross (D30). In other words, whether the data path 16a or 16b is blocked is determined.

If the data path 16a or 16b is blocked (YES in D30), the system goes down (machine down). If each of the data paths 16a and 16b is not blocked (NO in D30), the RoC 10 determines whether any expanded enclosure 30 (expanded DE) is blocked (D40). Specifically, whether a failure has occurred on any of the data paths 19a-1, 19a-2, 19a-2, and 19b-2 is determined.

If any expanded DE is blocked (YES in D40), the RoC 10 determines whether there is a difference in DE-blocked condition between the straight line (referred to as "route 0") relevant to the CM #0 and the straight line (referred to as "route 1") relevant to the CM #1 (D50). Specifically, a determination is made as to whether there is a difference in blocked condition between the straight line of the route 0 and that of the route 1 downstream of the BE-EXPs 11.

If there is a difference in DE-blocked condition (YES in D50), the DEs are blocked. Specifically, the expanded enclosure 30 including the target and the expanded enclosure 30 downstream thereof are blocked.

Whereas, if any expanded DE is not blocked (NO in D40), alternatively, if there is no difference in DE-blocked condition between the straight lines of the routes 0 and 1 (NO in D50), the target can be disconnected as it is.

Figure 15:
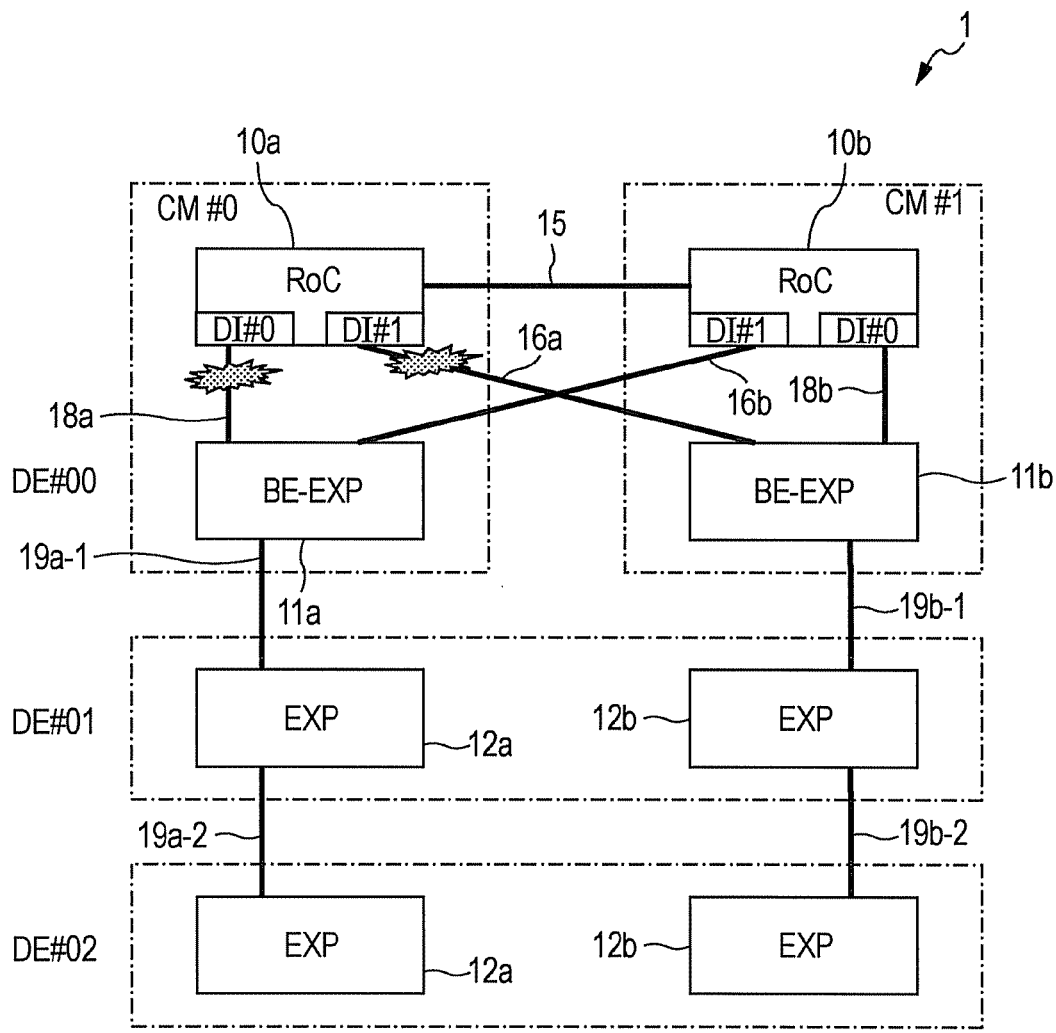
FIG. 15 is a diagram illustrating an exemplary determination branch in FIG. 14A and FIG. 14B.

If any straight blockage does not occur in each of the two CMs #0 and #1 (NO in D20), the RoC 10 determines whether both of a straight blockage and a cross blockage have occurred (D70). FIG. 15 illustrates a status in which both of a straight blockage and a cross blockage have occurred.

Referring to FIG. 15, a failure has occurred on each of the data paths 18a and 16a. The data path 18a corresponds to the straight blockage and the data path 16a corresponds to the cross blockage.

If both of straight and cross blockages have occurred (YES in D70), the relevant CM is blocked. If the relevant CM is being incorporated, the incorporation is interrupted.

Figure 16:
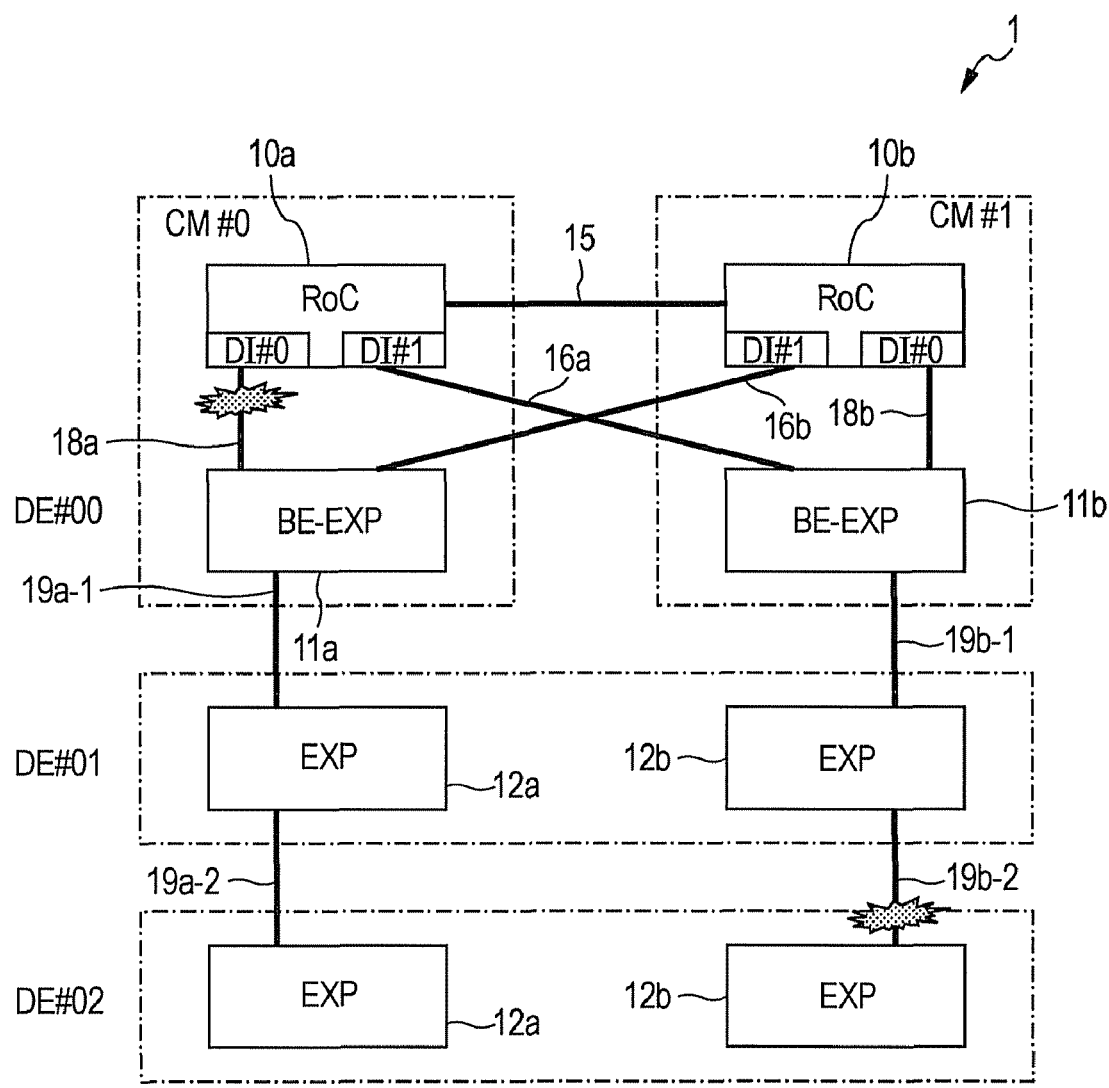
FIG. 16 is a diagram illustrating a status in which a straight blockage and a non-relevant expanded blockage have occurred.

If neither a straight blockage nor a cross blockage have occurred (NO in D70), the RoC 10 determines whether a straight blockage and a non-relevant expanded blockage have occurred (D80). FIG. 16 illustrates a status in which a straight blockage and a non-relevant expanded blockage have occurred.

Referring to FIG. 16, a failure has occurred on each of the data paths 18a and 19b-2. The data path 18a corresponds to the straight blockage and the data path 19b-2 corresponds to the non-relevant expanded blockage.

Figure 17:
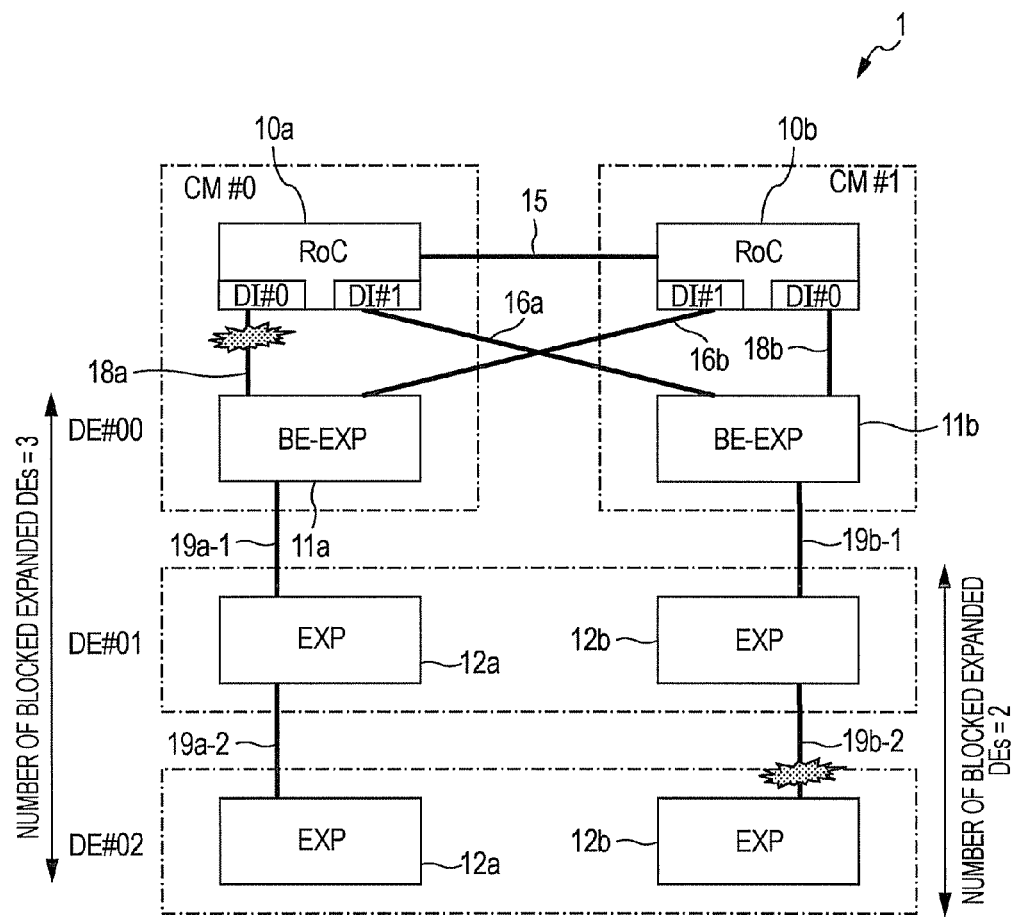
FIG. 17 is a diagram illustrating a status in which the number of non-relevant blocked expanded DEs is less than that of relevant blocked expanded DEs.

If a straight blockage and a non-relevant expanded blockage have occurred (YES in D80), the RoC 10 compares the number of blocked expanded DEs on the non-relevant route and that on the relevant route to determine whether the number of non-relevant blocked expanded DEs is less than that of relevant blocked expanded DEs (D120). FIG. 17 illustrates a status in which the number of non-relevant blocked expanded DEs is less than that of relevant blocked expanded DEs.

Referring to FIG. 17, a failure has occurred on each of the data paths 18a and 19b-2. Blocked expanded DEs on the non-relevant route include the EXP 12b in the expanded enclosure 30-1 (DE#01) and the EXP 12b in the expanded enclosure 30-2 (DE#02). In other words, the number of non-relevant blocked expanded DEs is 2. On the other hand, relevant blocked expanded DEs in FIG. 17 include the BE-EXP 11a, the EXP 12a in the expanded enclosure 30-1 (DE#01), and the EXP 12a in the expanded enclosure 30-2 (DE#02). In other words, the number of relevant blocked expanded DEs is 3. In the storage controlling system 1, the CM related to a greater number of blocked DEs is disabled, thus minimizing the effect of disabling.

If the number of non-relevant blocked expanded DEs is less than that of relevant blocked expanded DEs (YES in D120), the RoC 10 blocks the CM. If the CM is being incorporated, the incorporation is interrupted.

Figure 18:
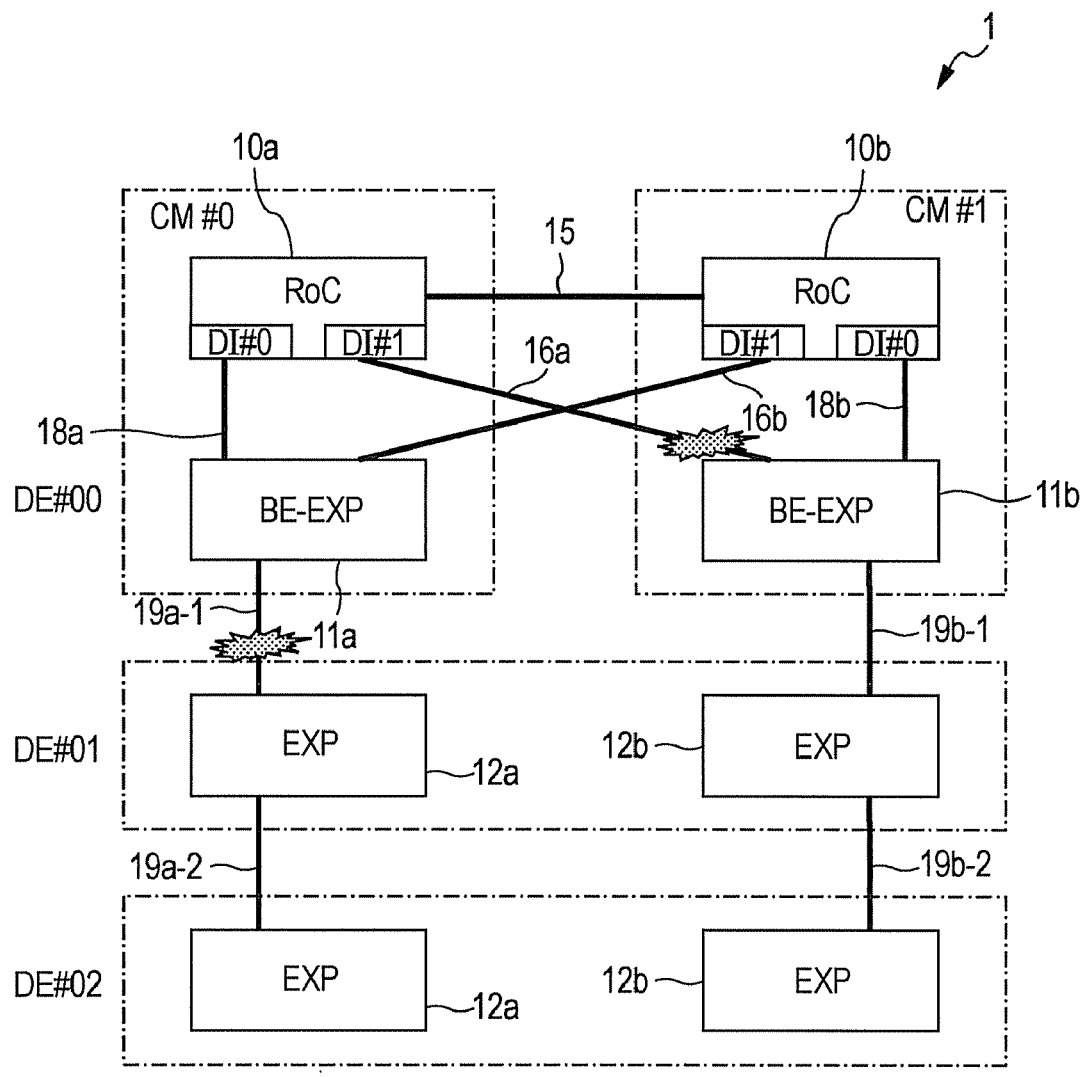
FIG. 18 is a diagram illustrating a status in which a relevant cross blockage and a relevant expanded blockage have occurred.

If neither a straight blockage nor a non-relevant expanded blockage have occurred (NO in D80), the RoC 10 determines whether a relevant cross blockage and a relevant expanded blockage have occurred (D90). FIG. 18 illustrates a status in which a relevant cross blockage and a relevant expanded blockage have occurred.

Referring to FIG. 18, a failure has occurred on each of the data paths 16a and 19a-1. The data path 16a corresponds to the relevant cross blockage and the data path 19a-1 corresponds to the relevant expanded blockage.

Figure 19:
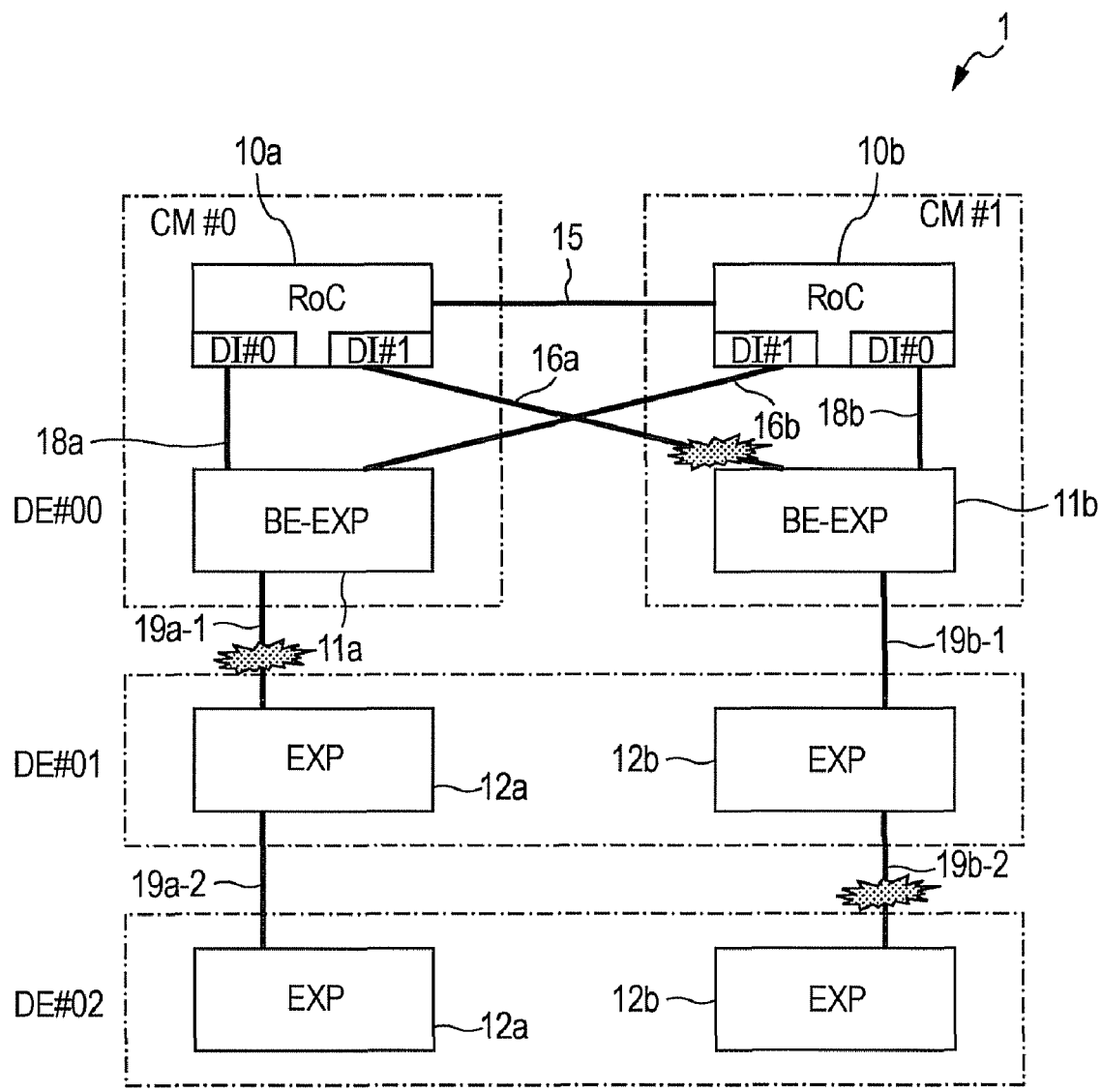
FIG. 19 is a diagram illustrating a status in which the number of relevant blocked expanded DEs is greater than that of non-relevant blocked expanded DEs.
Figure 20:
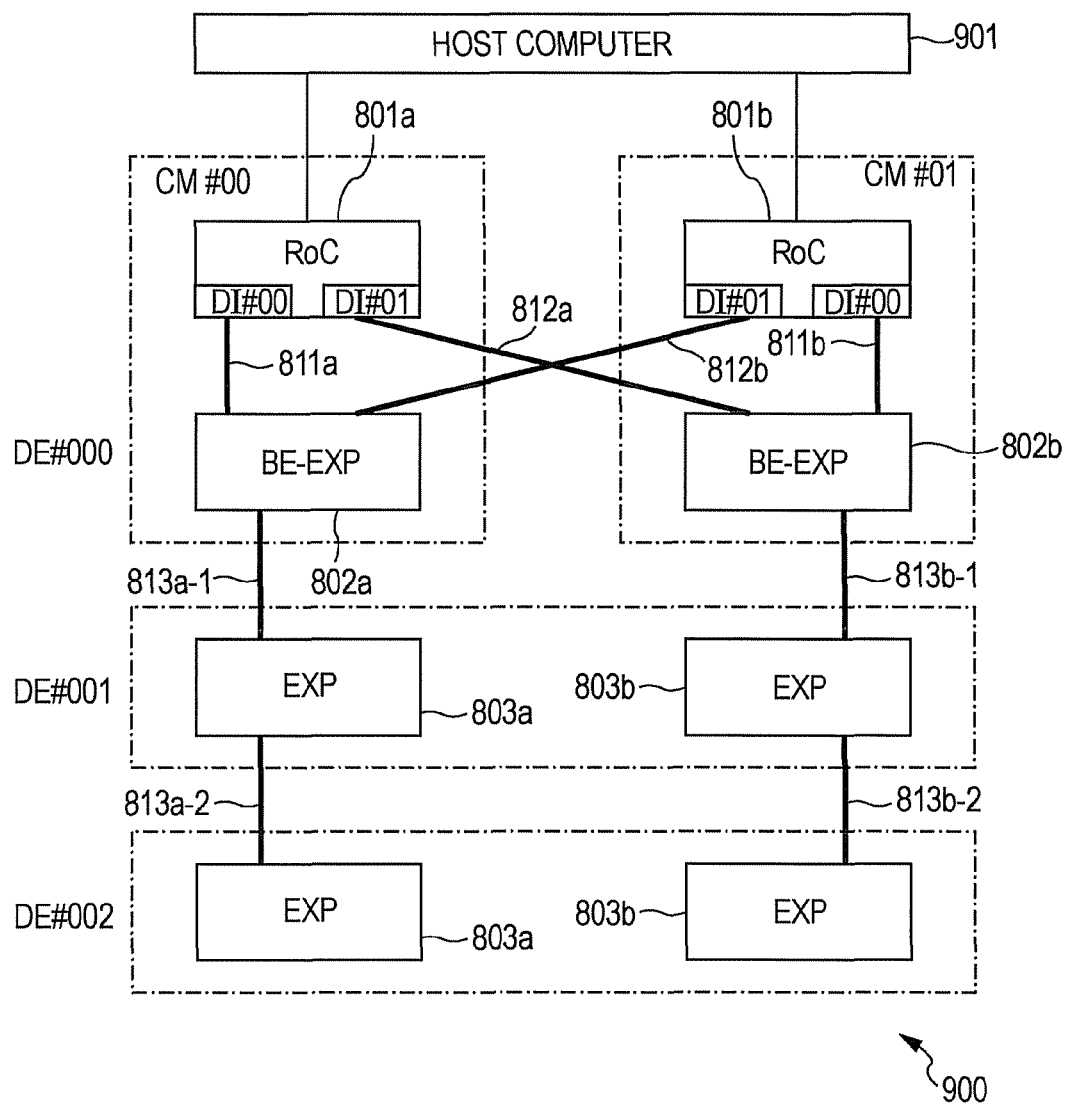
FIG. 20 is a diagram schematically illustrating the configuration of a related-art storage controlling system.
Figure 21:
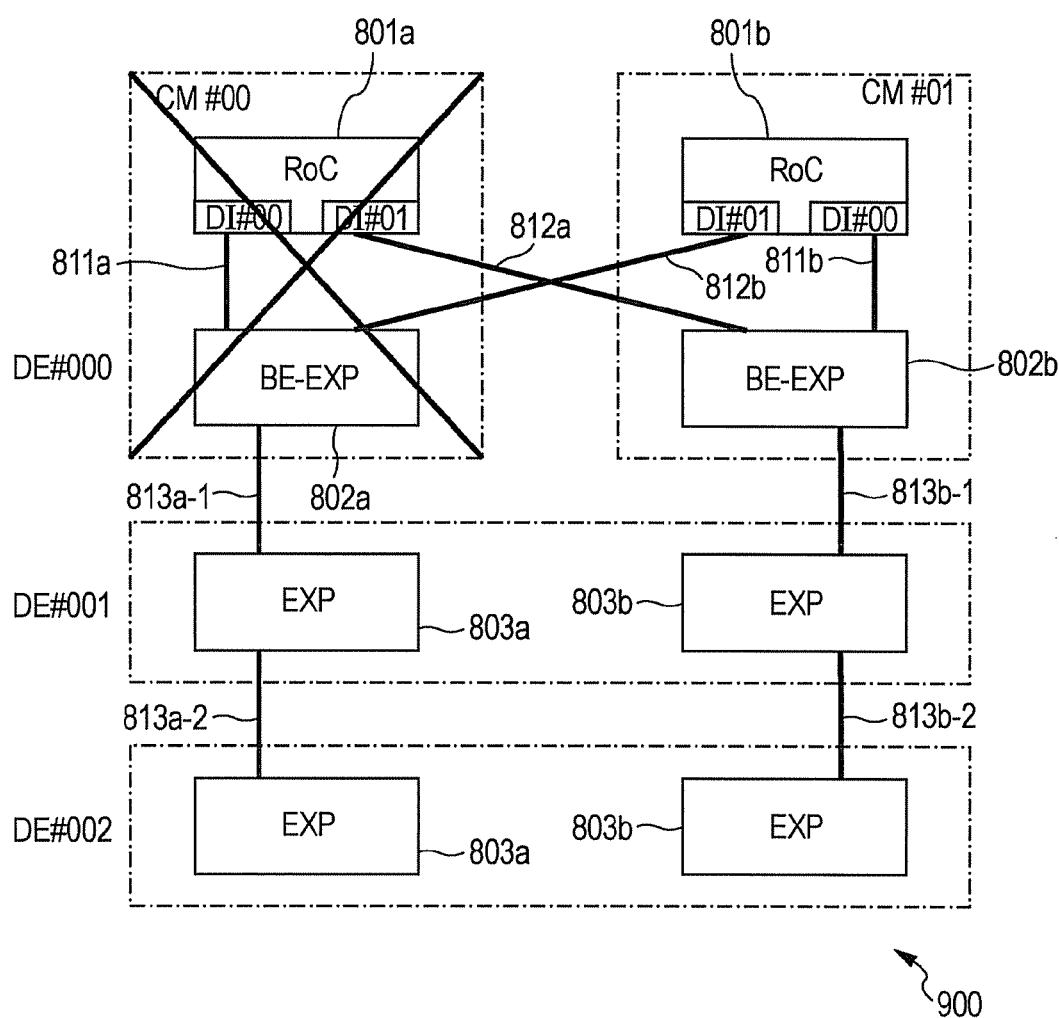
FIG. 21 is a diagram explaining a process performed upon recovery of a disabled CM in the related-art storage controlling system.
Figure 22:
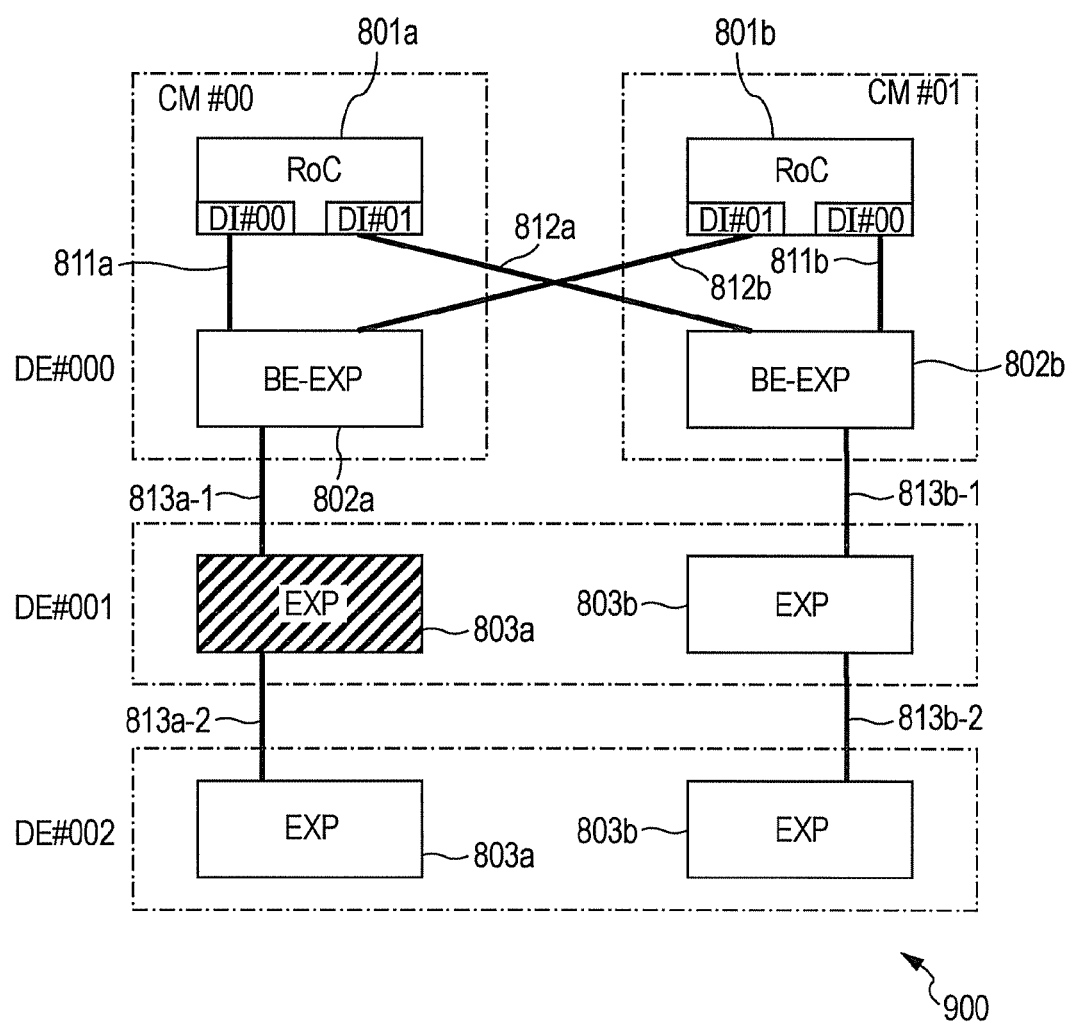
FIG. 22 is a diagram explaining the process performed upon recovery of the disabled CM in the related-art storage controlling system.
Figure 23:
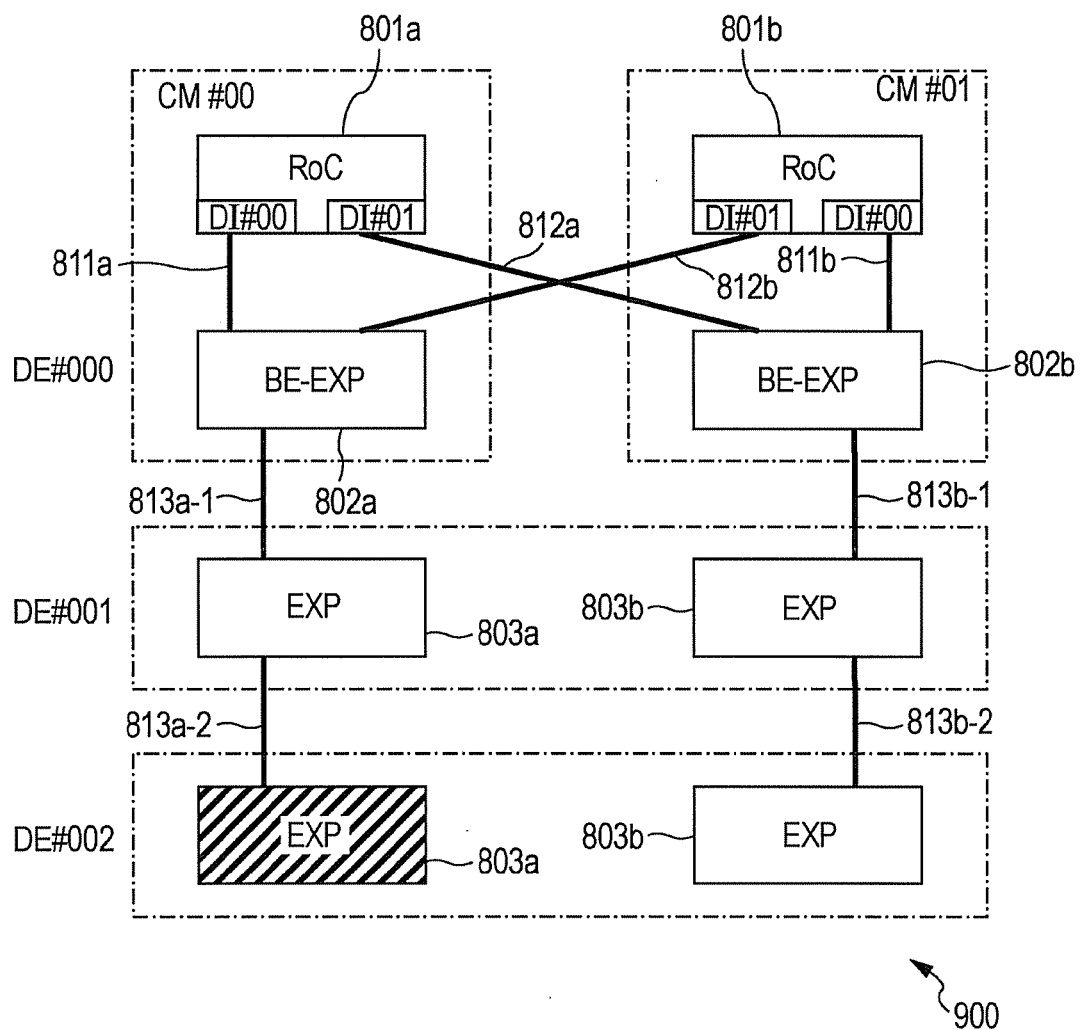
FIG. 23 is a diagram explaining the process performed upon recovery of the disabled CM in the related-art storage controlling system.
Figure 24:
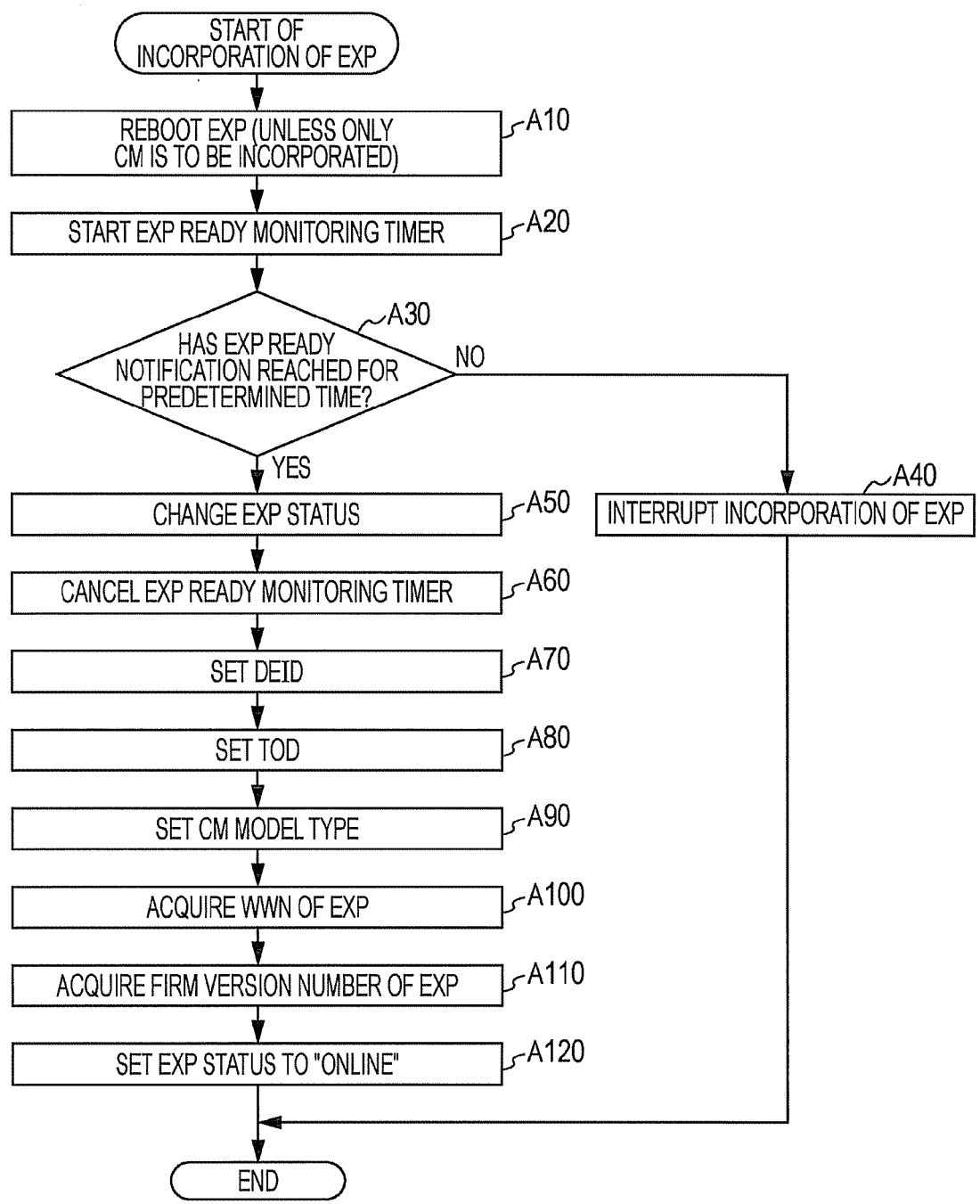
FIG. 24 is a flowchart explaining a process of incorporating an EXP in the related-art storage controlling system.
Figure 25:
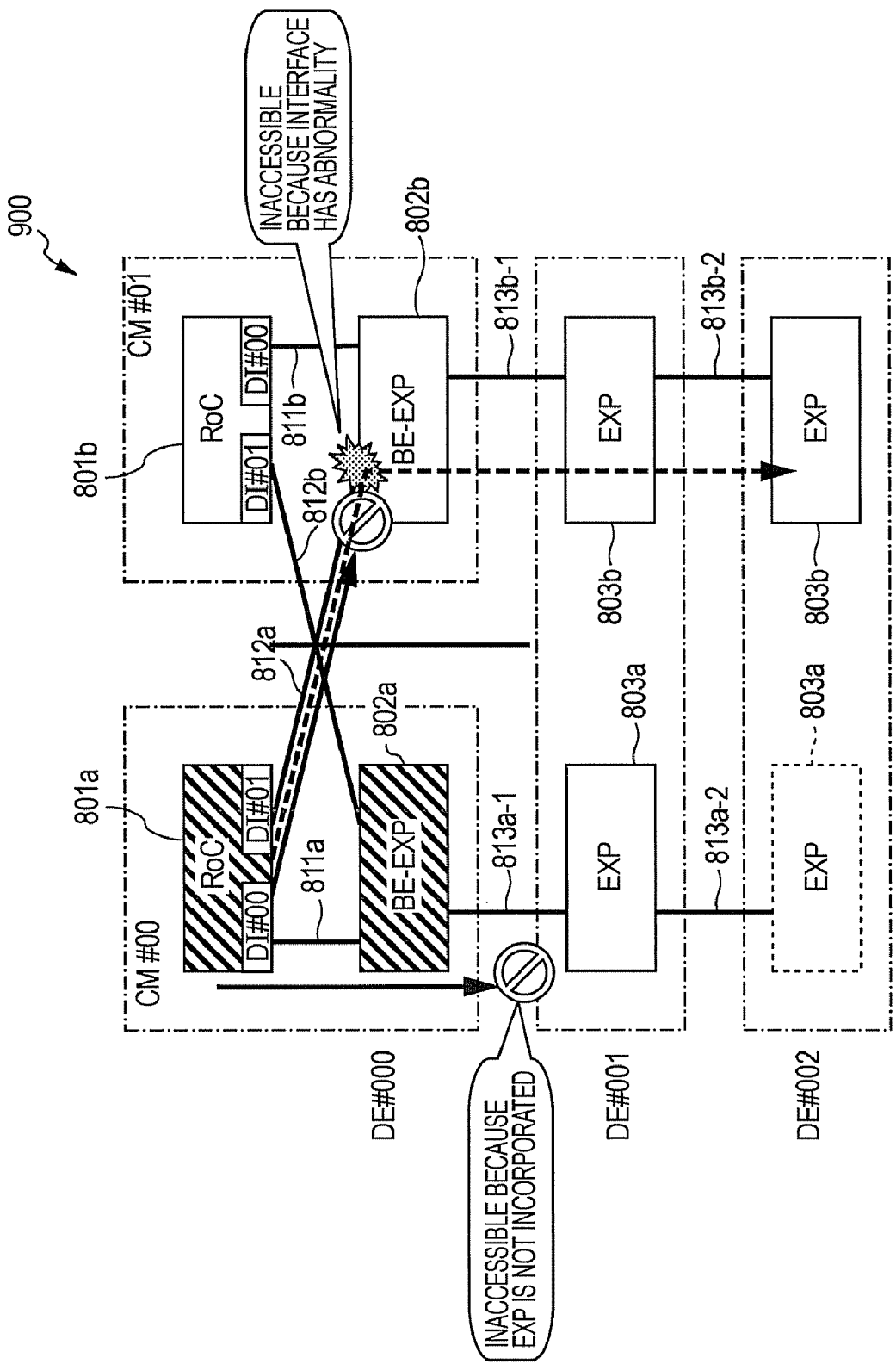
FIG. 25 is a diagram illustrating a status upon recovery of the CM in the related-art storage controlling system.
Figure 26:
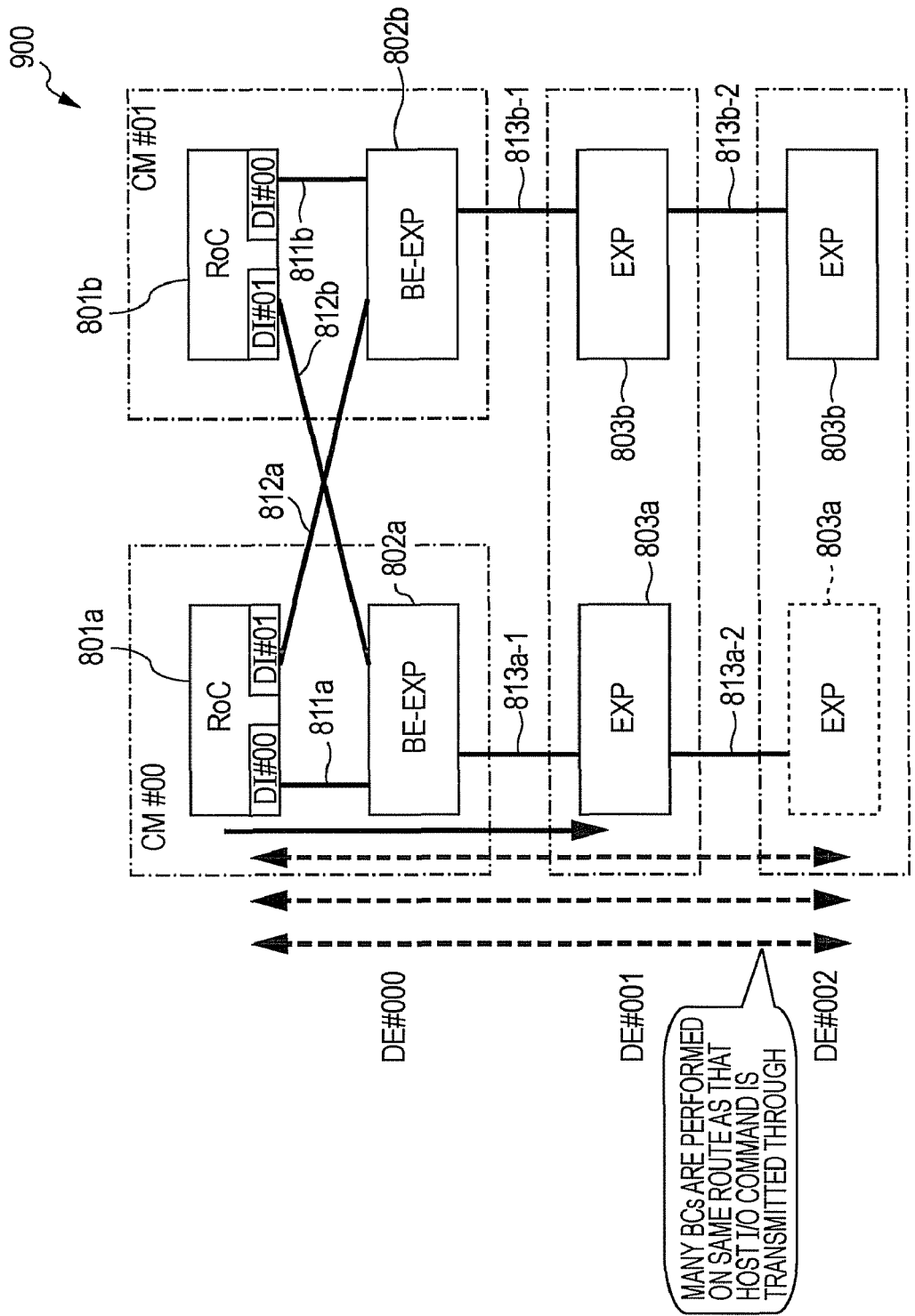
FIG. 26 is a diagram explaining a host I/O command and broadcasts in the related-art storage controlling system.

If a relevant cross blockage and a relevant expanded blockage have occurred (YES in D90), the RoC 10 compares the number of relevant blocked expanded DEs with that of non-relevant blocked expanded DEs to determine whether the number of relevant blocked expanded DEs is greater than that of non-relevant blocked expanded DEs (D130). FIG. 19 illustrates a status in which the number of relevant blocked expanded DEs is greater than that of non-relevant blocked expanded DEs.

Referring to FIG. 19, a failure has occurred on each of the data paths 16a, 19a-1, and 19b-2. Relevant blocked expanded DEs include the EXP 12a in the expanded enclosure 30-1 (DE#01) and the EXP 12a in the expanded enclosure 30-2 (DE#02). In other words, the number of relevant blocked expanded DEs is 2. On the other hand, a non-relevant blocked expanded DE in FIG. 19 includes the EXP 12b in the expanded enclosure 30-2 (DE#02). In other words, the number of non-relevant blocked expanded DEs is 1.

If the number of relevant blocked expanded DEs is greater than that of non-relevant blocked expanded DEs (YES in D130), the RoC 10 blocks the CM. If the CM is being incorporated, the incorporation is interrupted.

In either of the case where neither a relevant cross blockage nor a relevant expanded blockage have occurred (NO in D90), the case where the number of relevant blocked expanded DEs is not greater than that of non-relevant blocked expanded DEs (NO in D130), and the case where the number of non-relevant blocked expanded DEs is not less than that of relevant blocked expanded DEs (NO in D120), the RoC 10 determines whether to perform the process of incorporating the CM (D100).

If the process of incorporating the CM is not performed (NO in D100), the target can be disconnected as it is.

If the process of incorporating the CM is performed (YES in D100), the RoC 10 determines whether the relevant cross has a failure (abnormality) and a non-relevant expansion is normal (D110).

For example, in the case illustrated in FIG. 19, the data path 16a has an abnormality and the data path 19b-1 is normal. Specifically, FIG. 19 illustrates the status in which the relevant cross is abnormal and the non-relevant expansion is normal with respect to the route 0. If the relevant cross is abnormal and a non-relevant expansion is normal (YES in D110), as described above, the recovery control unit 3 performs incorporation in the first recovery control mode so that the EXP 12 is incorporated first before the CM.

Whereas, unless the relevant cross is abnormal and a non-relevant expansion is normal (NO in D110), the RoC 10 performs incorporation in the second recovery control mode so that the CM is incorporated first before the EXP 12.

As described above, in the storage controlling system according to the embodiment, since the EXP 12 is recovered from the isolated status first before the CM or simultaneously with the recovery of the CM during incorporation of the CM, the incorporation of the EXP 12 under the CM is completed at the time when the incorporation of the CM is completed. Consequently, a host I/O command is not output from the host computer 120 to an access path that is not recovered, thus increasing the reliability of the system.

Upon incorporation of the EXP 12, a broadcast signal is output. At this time, the incorporation of the CM upstream of the EXP 12 is not performed. Accordingly, a host I/O command from the host computer 120 is not transmitted on the path between the EXP 12 and the CM. In other words, a broadcast signal generated upon incorporation of the EXP 12 does not adversely affect a process related to a host I/O command, so that the system can exhibit stable performance.

In addition, since the recovery control unit 3 is operable selectively in either of the first and second recovery control modes, the system provides high convenience. The recovery control unit 3 may selectively control a first boot sequence which boots the CM#0 after the BE-EXP 11a, the EXPs 12a have been booted and a second boot sequence which boots the CM#1 before the BE-EXP 11a and the EXPs 12a have been booted. The recovery control unit 3 may determine one of the first boot sequence and the second boot sequence on the basis of a place where a failure has occurred in a recovery process.

When the first recovery control mode is selected, the above-described advantages can be obtained. When the second recovery control mode is selected, a data path can be recovered for a short time and the tried-and-true method is used, thus increasing the reliability of the system.

Upon incorporating or disconnecting a component, e.g., an EXP 12, an optimum method of incorporation can be selected in accordance with the status of the storage controlling system 1 and the component can be incorporated or disconnected. Thus, the system can be operated stably.

Disclosed techniques are not limited to the above-described embodiment and various changes and modifications thereof can be made without departing from the spirit of the embodiment.

For example, in the above-described embodiment, the enclosures DE#00 to DE#02 each include the three storage apparatuses 20. The number of storage apparatuses 20 is not limited to this example and may be appropriately changed.

In addition, in the above-described embodiment, the two CMs #0 and #1 are arranged. The number of CMs is not limited to this example. The system may include three or more CMs.

Furthermore, the above embodiment has been described with respect to the case where the system includes the two expanded enclosures 30-1 and 30-2. The number of expanded enclosures is not limited to this example. The system may include one expanded enclosure or four or more expanded enclosures.

In addition, the above-described disclosure enables those skilled in the art to practice and make the present embodiment.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present inventions have been described in detail, it should be understood that the various changes, substitutions, and alterations could be made hereto without departing from the spirit and scope of the invention.

What is claimed is:

1. A storage system comprising:
    a plurality of first expanders to connect a plurality of storage units, each of the plurality of first expanders being connected cascade each other;
    a plurality of second expanders to connect the plurality of storage units, each of the plurality of second expanders being connected cascade each other;
    a first controller connected with one of the plurality of first expanders, one of the plurality of second expanders and a host;
    a second controller connected with the one of the plurality of second expanders, the one of the plurality of first expanders and the host, the second controller detecting a failure of at least one of the first controller, the plurality of first expanders and the plurality of second expanders, the second controller selectively controlling a first boot sequence which boots the first controller after the plurality of first expanders have been booted and a second boot sequence which boots the first controller before the plurality of first expanders have been booted, determining one of the first boot sequence and the second boot sequence based on a place where a failure has occurred in a recovery process.

2. The storage system according to claim 1, wherein, when the failure has occurred at the connection between the first controller and one of the plurality of second expanders, and at one of the first controller and one of the plurality of first expanders, the second controller determines the first boot sequence.

3. The storage system according to claim 1, wherein, when the failure has occurred at one of the first controller and one of the plurality of first expanders, the second controller determines the second boot sequence.

4. The storage system according to claim 1, wherein the second controller disconnects, from a data path of the storage system, the plurality of the first expanders and the first controller based of the failure.

5. The storage system according to claim 1, wherein the second controller detects that a first failure occurred at one of the first expanders and a second failure occurred at the one of the plurality of second expanders, and outputs a maintenance request notification related to the second failure.

6. The storage system according to claim 1, wherein the second controller determines a target to be disconnected based on a location information indicating where a failure has occurred.

7. A storage control apparatus comprising:
    a hardware interface to connect a host, a plurality of first expanders, a first controller, and a plurality of second expanders, a host, the plurality of first expanders for connecting a plurality of storage units, each of the plurality of first expanders being connected cascade each other, the plurality of second expanders for connecting the plurality of storage units, each of the plurality of second expanders being connected cascade each other, the first controller connected with one of the plurality of first expanders, one of the plurality of second expanders and the host; and
    a processor that executes a program including a procedure, the procedure including:
        detecting a failure of at least one of the first controller, the plurality of first expanders and the plurality of second expanders,
        selectively controlling a first boot sequence which boots the first controller after the plurality of first expanders have been booted and a second boot sequence which boots the first controller before the plurality of first expanders have been booted, and
        determining one of the first boot sequence and the second boot sequence based on a place where a failure has occurred in a recovery process.

* * * * *

UNITED STATES PATENT AND TRADEMARK OFFICE
CERTIFICATE OF CORRECTION

| | | |
|---|---|---|
| PATENT NO. | : 8,307,244 B2 | |
| APPLICATION NO. | : 12/786626 | |
| DATED | : November 6, 2012 | |
| INVENTOR(S) | : Kouichi Tsukada et al. | |

It is certified that error appears in the above-identified patent and that said Letters Patent is hereby corrected as shown below:

Column 20, Line 4, In Claim 4, delete "based of" and insert -- based on --, therefor.

Signed and Sealed this
Fifth Day of March, 2013

Teresa Stanek Rea
*Acting Director of the United States Patent and Trademark Office*